United States Patent [19]

Yamaguchi et al.

[11] Patent Number: 5,243,482

[45] Date of Patent: Sep. 7, 1993

[54] FLOATING TYPE MAGNETIC HEAD SUPPORTING ASSEMBLY INCLUDING A COUPLING TO A SLIDER SIDE SURFACE

[75] Inventors: Yuzo Yamaguchi; Mikio Tokuyama, both of Tsuchiura; Yoshinori Takeuchi; Taichi Sato, both of Ishioka; Satomitsu Imai, Ibaraki, all of Japan

[73] Assignee: Hitachi, Ltd., Tokyo, Japan

[21] Appl. No.: 601,429

[22] Filed: Oct. 23, 1990

[30] Foreign Application Priority Data

Oct. 20, 1989 [JP] Japan .................. 1-271659
Nov. 8, 1989 [JP] Japan .................. 1-290527

[51] Int. Cl.⁵ .................. G11B 5/48; G11B 5/60; G11B 21/20
[52] U.S. Cl. .................. 360/104; 360/103
[58] Field of Search .................. 360/103–106

[56] References Cited

U.S. PATENT DOCUMENTS

| 4,204,235 | 5/1980 | Stollorz | 360/104 |
| 4,620,251 | 10/1986 | Gitzendanner | 360/104 |
| 4,646,181 | 2/1987 | Morigaki | 360/104 |
| 4,922,356 | 5/1990 | Yamaguchi et al. | 360/104 |
| 4,954,919 | 9/1990 | Yamada | 360/104 |
| 4,998,174 | 3/1991 | Wada et al. | 360/104 |
| 5,019,931 | 5/1991 | Ohwe et al. | 360/104 |
| 5,126,903 | 6/1992 | Matsuzaki | 360/104 |

FOREIGN PATENT DOCUMENTS

| 60-55571 | 3/1985 | Japan | 360/104 |
| 61-26979 | 11/1986 | Japan | 360/104 |
| 2-208879 | 8/1990 | Japan | 360/104 |

*Primary Examiner*—Stuart S. Levy
*Assistant Examiner*—Jefferson Evans
*Attorney, Agent, or Firm*—Antonelli, Terry, Stout & Kraus

[57] ABSTRACT

In a floating type magnetic head support mechanism for a magnetic disk apparatus, a slider carrying a magnetic head floats a small distance above a magnetic disk in accordance with a rotation of the magnetic head to enable a reading/writing of information from/onto the disk by the magnetic head. The slider is coupled to a distal end of a load arm through a gimbal. The coupling portion is located in a common plane parallel with a floating surface of the slider, with the coupling portion including a center of gravity of the slider or being in a parallel plane closer to the floating surface than the center of gravity. The magnetic head support mechanism is so constructed that no rotational moment is applied to a slider during the access operation by the access mechanism.

14 Claims, 18 Drawing Sheets

$$\Delta h = \frac{y}{2} \cdot \theta_2$$

FLOATING TYPE MAGNETIC HEAD SUPPORTING ASSEMBLY INCLUDING A COUPLING TO A SLIDER SIDE SURFACE

BACKGROUND OF THE INVENTION

The present invention relates to a floating type magnetic head support mechanism in a magnetic disk apparatus and, more particularly, to a magnetic head support mechanism in which a change in a floating amount of the magnetic head is suppressed upon access to the magnetic disk. The invention further relates to a magnetic disk apparatus provided with such a magnetic support mechanism.

For example, U.S. Pat. No. 4,620,251 proposes a support mechanism in which a flexible member of a gimbal of a magnetic head support mechanism extends in a direction perpendicular to an access direction of a slider. As disclosed in this patent, the flexible member is connected through a step portion to a coupling member provided in a surface substantially in parallel to the floating surface of the slider. The coupling member is coupled to a surface opposite to the floating surface of the slider.

Generally, in such a conventional mechanism, a distance between the floating surface and the coupling surface between the slider and the gimbal is longer than a distance between a center of gravity of the slider and the floating surface. For this reason, the slider is subjected to a dynamic moment to be rotated by an inertial force which acts upon the center of gravity of the slider during the acceleration or deceleration. As a result, the floating amount of the slider, i.e., the distance between the slider and the magnetic disk, is decreased.

Accordingly, it is impossible to suppress the flowing amount to a remarkable extent during the constant operation of the slider. This becomes a hindrance with respect to the amount of memory of the magnetic disk.

FIGS. 54 to 57 illustrate a floating decreasing amount of the slider during the access operation in the foregoing magnetic head support mechanism, with the amount being referred to as a sinking amount $\Delta h$ of the slider.

As shown in FIGS. 54 and 55, the magnetic head support mechanism includes a load arm 200 (a load spring) and a gimbal 210 (a gimbal spring). As shown in FIG. 55, one end of the load arm 200 is connected by screws or the like (not shown) to a guide arm 230 connected to an access mechanism (not shown) and the other end holds the gimbal 210. One end of the gimbal 210 is connected to the load arm by spot-welding or the like, and the other end is coupled by adhesives or the like to a rear surface 22i of the slider 220, opposite to a floating top surface 222 facing a magnetic disk 240. The in-line type head support mechanism is characterized in that the slider 220 is provided with a floating rail (not shown) extending in the longitudinal direction of the load arm. FIG. 56 shows a model simulated to the magnetic head support mechanism upon the access operation from a mechanical and dynamic point of view. An application direction of acceleration $\alpha$ (260) is shown in FIG. 54 and a dimension of each part is shown in FIG. 55, wherein:

$l_1$ = a distance from a center of a plate thickness of the load arm to a center of gravity $G_g$ of the load arm to a center of gravity $G_g$ of the load arm;

$l_2$ = a distance from a center of a plate thickness of the load arm to a center of gravity G of the slider;

$Y_2$ = a distance from the center of plate thickness of the load arm to the coupling surface between the slider and the gimbal, with the coupling surface being the rear surface of the slider; and $l_w$ = a distance from the slider rear surface to the center of gravity G of the slider.

The characters shown in FIG. 56 are as follows:

$k_1$ = a strength of a proximal spring of the load arm;

$k_2$ = a strength of the spring of the gimbal;

$k_3$ = a strength of an air spring, between the disk and the slider, formed by rotation of the disk;

$\theta_0$ = a twist angle of the guide arm upon the access;

$\theta_1$ = a twist angle of the guide arm upon the access;

$\theta_2$ = a twist angle of the slider upon access, which angle is identical with the twist angle of the gimbal coupled to the slider. Namely, the twist angle $\theta_2$ is a rolling angle of the slider. The angle causes imbalance (access sinking amount) in a floating amount of the slider floating rail between an inner circumferential side and an outer circumferential side of the disk. That is, as shown in FIG. 57, $\Delta h$ is represented by the equation $\Delta h = (y/2) \cdot \theta_2$, where y = a width of the slider;

$\theta_3$ = a twist angle of the disk upon the access operation ($\theta_0$ and $\theta_3$ becomes zero because of a high rigidity);

$m_1$ = a mass of the load arm; and $m_2$ = a mass of the slider.

The deformation of each part upon access is given by the following equations in consideration of the equilibrium of the forces of the model shown in FIG. 56.

$$k_1 \cdot \theta_1 = m_1 \cdot l_1 \cdot \alpha - k_2 \cdot (\theta_1 + \theta_2) - m_2 \cdot y_2 \cdot \alpha \tag{1}$$

$$k_2 \cdot (\theta_2 - \theta_1) = m_2 \cdot (l_2 - Y_2) \cdot \alpha - k_3 \cdot \theta_2 \tag{2}$$

From equations (1) and (2), the following relationship may be determined:

$$\frac{\theta_2}{\alpha} = \frac{k_2(m_1 l_1 - m_2 y_2) - (k_1 + k_2) m_2 l_w}{k_1(k_2 + k_3) + k_2 \cdot k_3} \tag{3}$$

Since $k_3$ is larger than $k_2$ ($k_3 >> k_2$), equations (3) and (4) may be simplified as follows:

$$\frac{\theta_2}{\alpha} = \frac{1}{k_3} \left( \frac{k_2}{k_1 + k_2} (m_1 l_1 - m_2 y_2) - m_2 l_w \right) \tag{4}$$

The spring strengths, masses and lengths of the respective parts used are substituted into the right side of equation (4). The comparison among the magnitudes of the respective terms will be made. Incidentally, k, m, and $l_w$ are defined as follows:

$k = 1,700$ mm/rad, $k = 50$ gmm/rad, $l_w = 0.4$ mm, $m_1 = 44$ mg, $m_2 = 57$ mg The first term of the right side is:

$$\left( \frac{k_2}{k_1 + k_2} \right)(m_1 l_1 - m_2 y_2) \approx 2 \times 10^{-4} \tag{5}$$

$$m_2 l_w = 2 \times 10^{-2} \tag{6}$$

From equation (5) and (6):

$$\frac{k_2}{k_1 + k_2} \ll m_2 l_w \quad (7)$$

Equation (4) is further simplified as follows:

$$\frac{\theta_2}{\alpha} \approx \frac{-m_2 \cdot l_w}{k_3} \quad (8)$$

If the width of the slider is y, and the sinking amount of the slider is Δh (floating decreasing amount due to the access acceleration), Δh is determined by the following equation:

$$\Delta h = \frac{y}{2} \cdot \theta_2 = \left(\frac{y}{2}\right) \cdot \frac{\alpha \cdot m_2 \cdot l_w}{k_3} \quad (9)$$

From equation (9), there are two methods of reducing the value Δh, namely, (a) decreasing y, $m_2$, Δ, and $l_w$ and (b) increasing $k_3$. Assuming that the slider configuration, the slider load, and the access acceleration are kept unchanged, in order to reduce Δh by improving the magnetic head mechanism, the decreasing of $l_w$ is effective to reduce Δh in equation (9).

However, in the conventional in-line type magnetic head support mechanism shown in FIG. 55, since the gimbal 210 is mounted on the slider rear surface 221, it is structurally impossible to reduce $l_w$. Namely, due to the construction of the magnetic head support mechanism, it is impossible to reduce $l_w$.

SUMMARY OF THE INVENTION:

Accordingly, an object of the invention is to provide a magnetic head support mechanism for suppressing the change in floating amount caused upon the access operation of the slide provided with the magnetic head, whereby it is possible to reduce a change of contact between the slider and the magnetic disk even if the floating amount of the slider is small, thereby attaining a high recording density.

Another object of the present invention is to provide a magnetic disk apparatus which is capable of attaining the high recording density.

In order to attain these and other objects, according to the invention, the magnetic head support mechanism is provided which comprises a slider carrying a magnetic head and a floating surface facing the magnetic disk, a flexible gimbal for carrying the slider at its end, and a load arm to which a rear end portion of the gimbal is mounted, with the gimbal being provided with a coupling portion having a parallel surface flush with a slider central plane in parallel to the floating surface of the slider and including the center of gravity of the slider, or located toward the floating surface away from the slider central plane.

According to the invention, upon rotation of the magnetic disk, air is blown between the magnetic disk and the floating top surface of the slider, and the slider is balanced with the load generated in the elastic portion of the load arm so that the slider is floatingly suspended, when the access mechanism is driven, and acceleration is applied in the access direction directed substantially in radial direction of the magnetic disk through the load arm and the gimbal.

In the magnetic head support mechanism according to the invention, the applied point of the acceleration applied to the slider is identical with the slider central surface. A rotational moment is not generated in the slider. Accordingly, the slider is not slanted. Thus, the floating amount of the slider is not reduced.

The coupling surface between the gimbal and the slider is shifted toward the slider floating surface from the slider central surface including the center of gravity of the slider, so that upon the access, no reduction of the floating amount, due to gimbal deformation, is generated.

DESCRIPTION OF PREFERRED EMBODIMENTS

Figure 1:
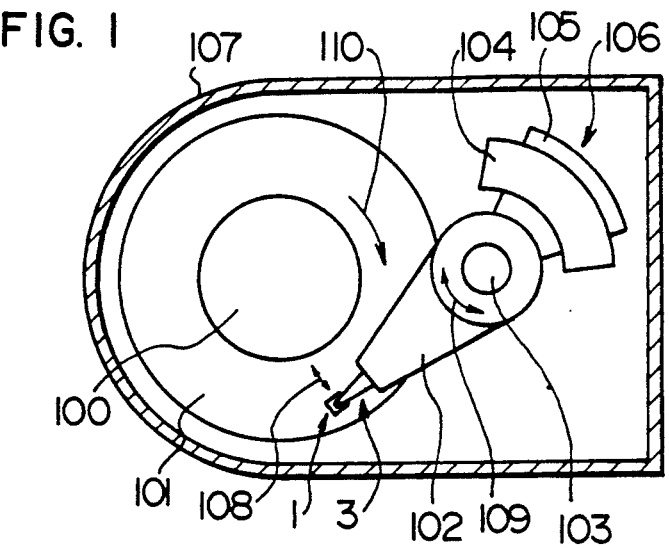
FIG. 1 is a partial cross-sectional view of a magnetic disk apparatus on which a magnetic head support mechanism according to a first embodiment of the invention is mounted.

Referring now to the drawings wherein like reference numerals are used throughout the various views to designate like parts and, more particularly, to FIGS. 1–6, according to these figures, a magnetic disk apparatus is provided with a magnetic head support mechanism in accordance with a first embodiment of the present invention includes a magnetic disk 101 mounted on a magnetic disk rotary shaft 100. A slider 1, carrying a magnetic head 2, is supported above the magnetic disk surface by a magnetic head support mechanism 3 and is coupled to the guide arm 102. According to this embodiment, the magnetic disk 101 is rotated in a direction indicated by an arrow 110. The guide arm 102 is rotated about an access rotary shaft 103 to cause the magnetic head 2 (not shown in FIG. 1) to move at a desired radial position of the magnetic disk 101 for setting. The rotational direction of the access rotary shaft 103 is indicated by an arrow 109, and a movement of the magnetic head in the radial direction of the magnetic disk as indicated by an arrow 108. The radial movement of the magnetic head 2 on the magnetic disk 101 for reading out data written on the surface of the magnetic disk 101 and writing data at a predetermined position in the radial direction is generally called an access operation, simply referred to as an access, and a seek operation, respectively. However, these operations will hereinafter be simply referred to as an access. The access mechanism 106 includes a coil 105 and a magnet 104 for rotating the guide arm 102 about the access rotary shaft 103 to position the magnetic head 2 as a predetermined radial position. These components are encased in a sealing casing 107.

Figure 2:
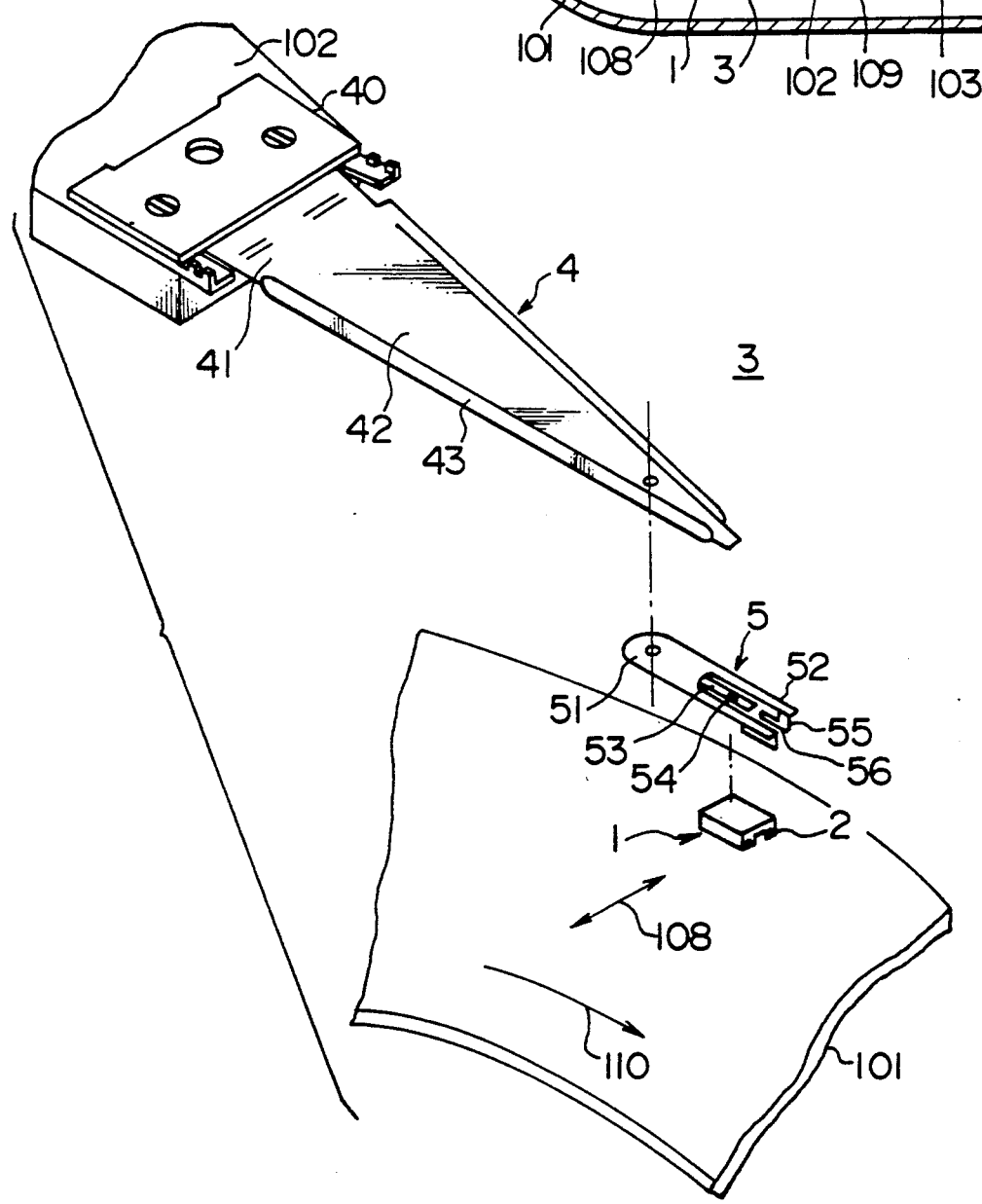
FIG. 2 is an exploded view of the magnetic head support mechanism shown in FIG. 1.

As shown in FIG. 2, the magnetic head support mechanism 3 includes a load arm 4 and a gimbal 5. One end of the load arm 4 is fixed to a distal end of the guide arm 102 by fastening means such as, for example, screws, through a spacer 40, and the other end of the load arm 4 is adapted to hold, by spot welding or the like, the gimbal 5 supporting the slider 1. The load arm 4 includes a flexible portion 41 for generating a depression load (which will be simply referred to as a load) against the slider 1, a load beam portion 42 and flange portion for transmitting the load to the slider 1. The gimbal 5 has two flexible finger portions made of flexible material and juxtaposed substantially parallel to a floating surface of the slider (i.e., the surface facing the magnetic disk 101) and extend in a direction substantially perpendicular to the access direction 108 (seek direction) of the slider 1. One end of each flexible finger portion 52 is coupled at a coupling portion 51 by spot-welding and the like (not shown) to the load arm 4 which is made of a more rigid material than that of the gimbal 5. The other end of each flexible finger portion 52 is contiguous with a stepped portion 55 extending substantially perpendicular to the floating surface of the slider, i.e., the magnetic disk surface and toward the floating surface. The other end of each stepped member 55 is coupled to a coupling member 56 connected to the slider 1. A central tongue portion 53, contiguous to a stepped portion, is formed in a central portion of a gimbal in the longitudinal direction. A load projection 54 is provided is provided on the central tongue portion 53.

Figure 3:
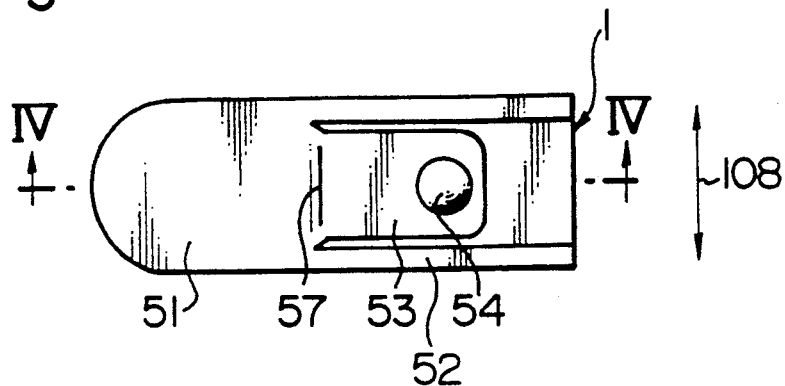
FIG. 3 is a plan view of the slider and gimbal of FIG. 2.
Figure 4:
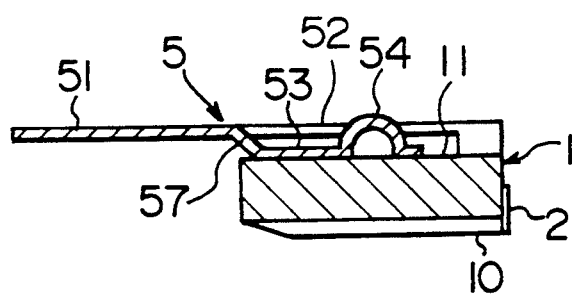
FIG. 4 is a cross-sectional view taken along the line IV—IV in FIG. 4.
Figure 5:
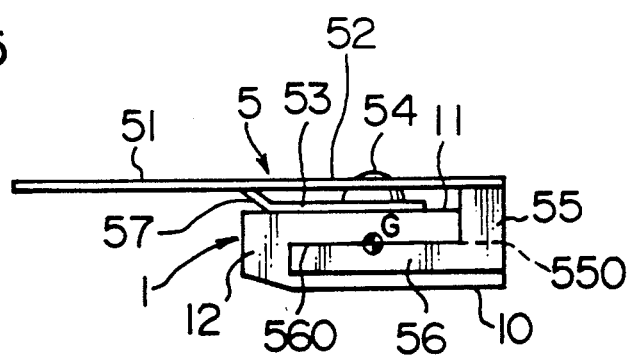
FIG. 5 is a side view of the slider and the gimbal of FIG. 3.
Figure 6:
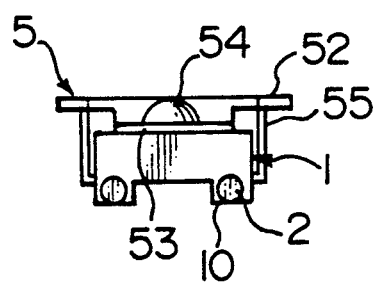
FIG. 6 is a front view of the slider and the gimbal of FIG. 3.

As shown in FIGS. 3 and 5, the gimbal 5 includes the two flexible finger portions 52 extending substantially perpendicular to the access direction 108 from the coupling portion 51 and substantially in parallel to the floating surface, the central tongue portion 53 having the load projection 54, the stepped member 55 and the coupling member 56 connected to one side surface of the slider 1. As shown in FIG. 4, the central tongue portion 53 is connected to the coupling portion 51 through the stepped portion 57 and is bonded to the rear surface 11 of the slider 1 by adhesive or the like. As shown in FIGS. 5 and 6, the end of each flexible finger portion 52 is connected to the associated stepped member 55 extending substantially perpendicular to the slider floating surface 10 and toward the floating surface. The other end of each of the stepped members 55 is connected to the coupling member 56 coupled to the slider 1. The coupling member 56 extends substantially in parallel to an extension direction of the flexible finger portions 52. The end of each stepped member 55, which is a coupling portion between the coupling member 56 and the stepped member 55; is substantially in parallel to the floating surface 10 of the slider 1, with a distance from the floating surface 10 being set at a distance equal to a distance between the center of gravity G of the slider 1 and the floating surface 10. In other words, the end of the stepped member 55 is included in a plane which is parallel to the floating surface and includes the center of gravity G of the slider 1. In this embodiment, since an edge 560, on the remote side from the slider floating surface 10 of the coupling member 56, is coplanar with the end 550 imaginary or the stepped member 55, the edge 560 is included in the surface which is parallel with the floating surface 10 and includes the center of gravity G of the slider 1.

Subsequently, an explanation will be made as the reduction of Δh of the floating amount of the slider upon the access operation with the magnetic head support mechanism 3.

Figure 7:
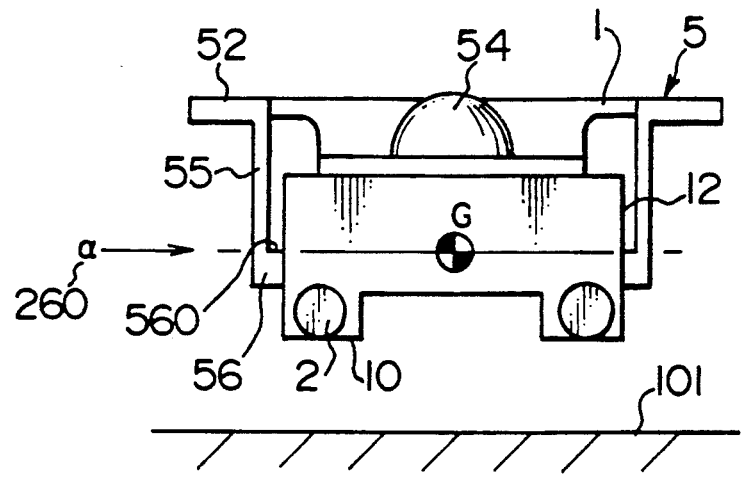
FIG. 7 is a view illustrating the function of the first embodiment of FIGS. 1 to 6.
Figure 55:
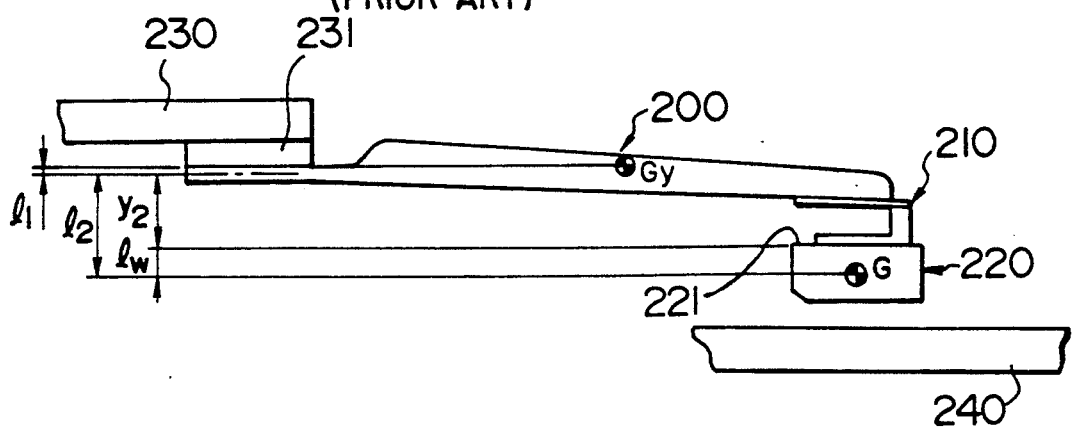
FIG. 55 is a side view of the mechanism of FIG. 54.
Figure 56:
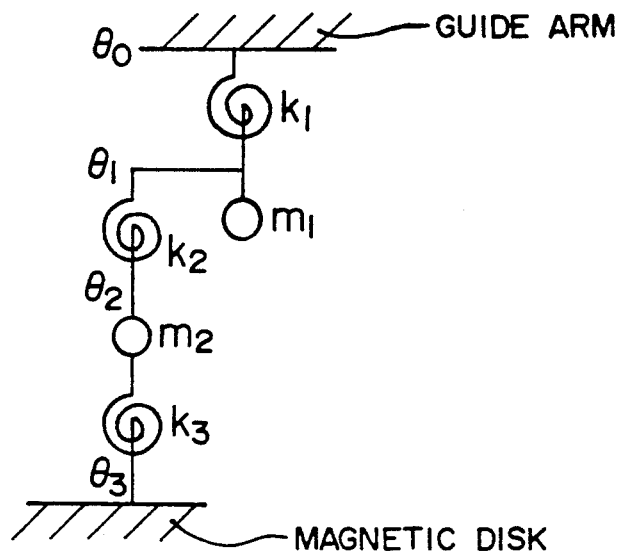
FIGS. 56 and 57 are views of mechanical and dynamic models of the conventional support mechanism.
Figure 57:
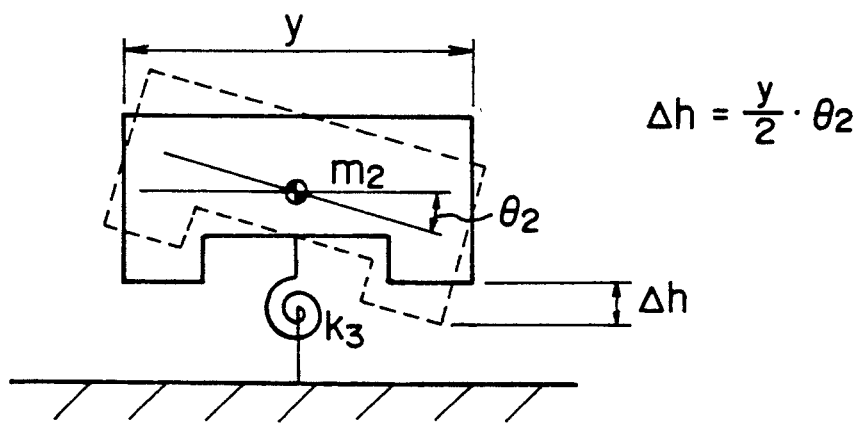

In the magnetic head support mechanism shown in FIGS. 1 through 6, it is possible to make zero a distance $l_w$ (FIG. 55) from the rear surface 11 of the slider 1 to the center of gravity G of the slider 1 to thereby considerably reduce the sinking amount Δh by the support mechanism for supporting the side surfaces of the slider 1. The reason for this will be explained with reference to FIG. 7.

As described above, each flexible finger portion 52 is connected to the associated stepped member 55 which extends substantially perpendicular to the floating surface 10 of the slider 1 and in the direction of the floating surface 10. The other end of the stepped member 55 is connected to the coupling member 56 coupled to the slider 1 as shown in FIG. 6. The coupling member 56 and the slider 1 are coupled to each other with an adhesive and the like. The end of the stepped member 55, which is the coupling portion between the stepped member 55 and the coupling member 56, is located in the same plane including the center of gravity G in parallel with the floating surface 10 of the slider I. In this embodiment, the end of the stepped member 55 is coplanar with the edge 560 on the remote side from the floating surface of the coupling member 56, and, namely, is located in the same plane as the center of gravity G. For this reason, the acceleration α is generated in a plane and parallel to the sliding floating surface 10 including the center of gravity G of the slider 1. Therefore, the distance $l_w$ of equation (9) becomes zero to thereby considerably decrease the sinking amount Δh of the slider 1. As a result, the contact between the slider 1 and the disk 101 due to the sinking amount Δh generated by the acceleration α upon access is avoided, so that data stored in the disk surface and a malfunction in a data read/write operation may be avoided.

Figure 8:
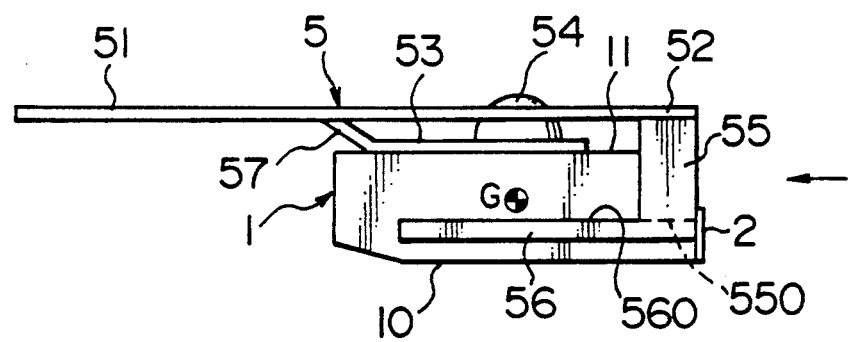
FIG. 8 is a side view of a portion of the second embodiment of the invention.
Figure 9:
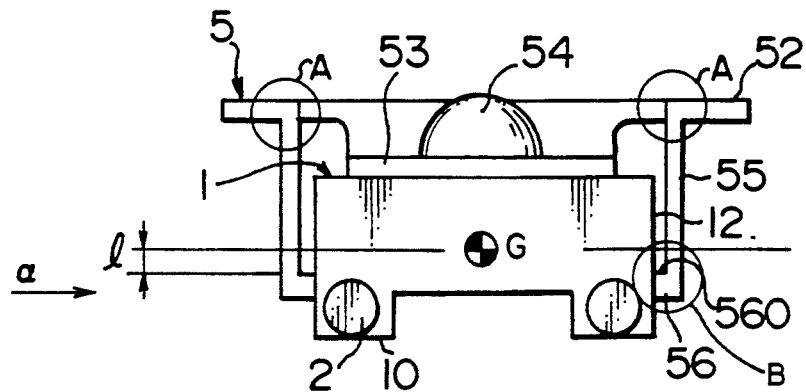
FIG. 9 is a front view of a portion of FIG. 8.

The magnetic head support mechanism of the second embodiment in FIGS. 8 and 9 differs from the first embodiment in that the end of the stepped member 55, which is the coupling portion between the stepped member 55 and the coupling member 56, is located closer to the floating surface 10 than the center of gravity G of the slider 1. In other words, in the embodiment of FIGS. 8 and 9, the ends of the stepped members 55 are located at a position shifted toward the floating surface 10 from the center of gravity G by a distance l. In the same manner as in the first embodiment, the coupling members 56 extend substantially in parallel to the extension direction of the flexible finger portions 52 and are bonded to the slider 1 with an adhesive or the like. Furthermore, in the embodiment of FIGS. 8 and 9, in the same manner as in the first embodiment, the edge 560, on the remote side from the floating surface., of each coupling member 56 is coplanar with the end 550 imaginary of the stepped member 55 shown in dashed lines FIG. 8.

An advantage of the embodiment of FIGS. 8 and 9 resides in the fact that, with such an arrangement, each stepped member 55 is bonded to the slider 1 so that the end of each stepped member 55 is connected to the associated coupling member 56 and is offset toward the floating surface 10 beyond the center of gravity G of the slider 1, and a slant angle $\theta_A$ of the slider 1, due to the moment generated in the coupling portion, indicated by A in FIG. 9, between each flexible finger portion and associated stepped member 52 may be canceled. In other words, the moment generated by the arrangement that the coupling member 56 is offset toward the floating surface of the slider by a distance l from the center of gravity G of the slider may be canceled with the moment generated in the flexible finger portion 52, thereby avoiding the reduction in floating amount due to deformation of the gimbal 5. Namely, although, in the first embodiment, it is possible to considerably reduce the sinking amount Δh during the access by locating the end of each stepped member 55 in a plane including the center of gravity G in parallel to the slider floating surface 10, according to the embodiment of FIGS. 8 and 9, the end of each stepped member 55 is somewhat displaced toward the floating surface 10, it is also possible to reduce the sinking amount Δh' to zero due to the deformation of the gimbal 5. Thus, it is possible for the sinking amount Δh to be zero during the access.

The advantage or effect of the arrangement that the coupling members 56 are located below the center of gravity G of the slider will be explained with reference to FIGS. 10-13.

Figure 10:
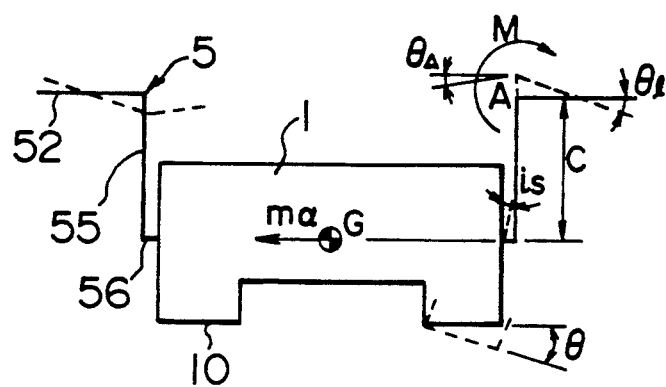
FIGS. 10 to 13 are schematic views of the portion of the embodiment of FIG. 8.

FIG. 10 is a schematic view showing a structure of the first embodiment in which the end of each stepped member is located in a plane including the center of gravity G in parallel with the slider floating surface 10 and shows the factors of the tilt θ of the slider 1 during access operation. The factors of the tilt θ include a tilt $\theta_l$ of each flexible finger portion 52 due to a moment M (= m α C/2) generated in the A portion in FIG. 10 by a distance C between the center of gravity G and the flexible finger portion 52 and an inertial moment m α/2, where m is the mass of the slider, and α is the access acceleration, a slant $\theta_\Delta$ generated by a lift of the steppe member 55 by the tile $\theta_l$, and a slant angle $i_s$ generated by a shearing force of mα.

Namely, the tilt θ of the slider 1 is determined by the following equation:

$$\theta = \theta_l + \theta_{66} i_s \qquad (10)$$

In comparing the magnitudes of the respective terms with each other, it is readily understood that the tilt of the slider depends mainly upon the tilt $\theta_l$, where:

$$\theta = \theta_l \qquad (11)$$

Figure 11:
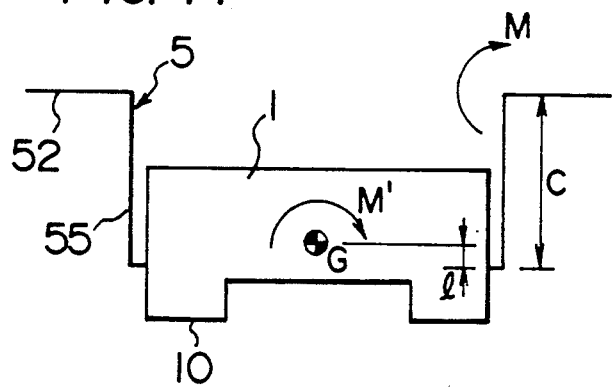

Accordingly, if the coupling portion between the slider 1 and the coupling member 56 is shifted toward the floating surface 10 from the center of gravity G of the slider 1 as shown in FIG. 11, the moment M' (= m αl/2) about the center of gravity G is generated and acts in a direction in which the moment M' cancels the moment M generated in the portion A. For this reason, it is possible to make substantially zero the tilt θ of the slider 1 due to the deformation of the gimbal by the access acceleration.

Figure 12:
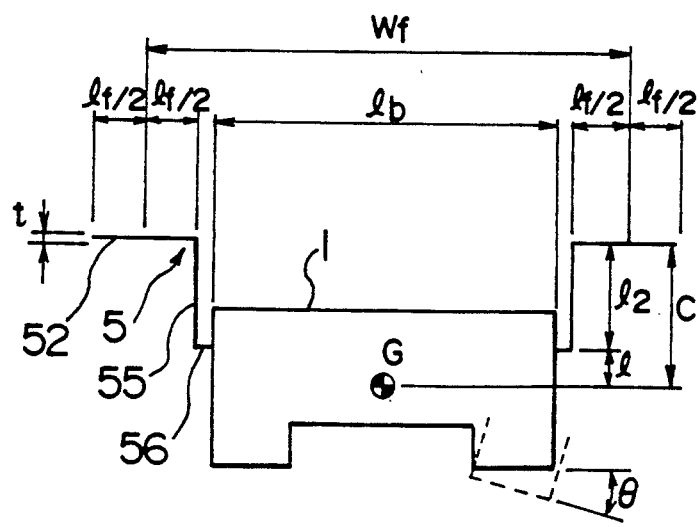
Figure 13:
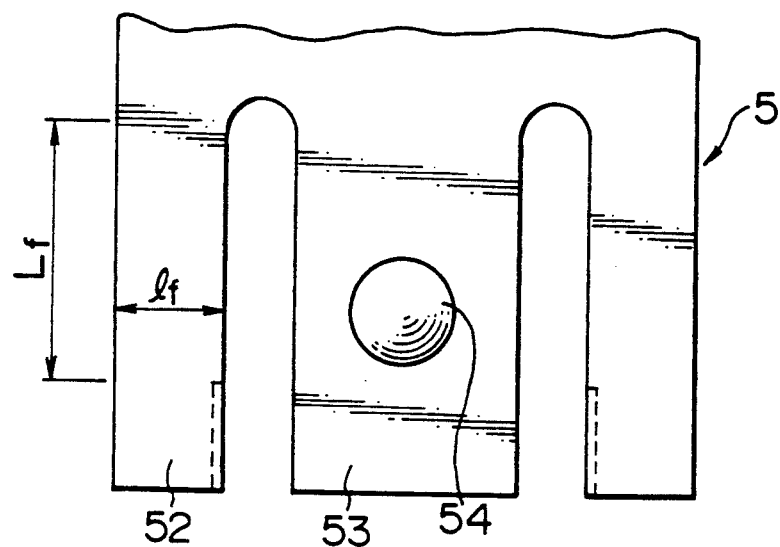

The slant angle $\theta$ of the slider 1 due to the access acceleration will be explained in more detail in the case where the slider support point is shifted by the distance l from the center of gravity G (i.e., toward the rear side 11 of the slider 1) with reference to FIGS. 12 and 13. As shown in FIGS. 12 and 13, the tilt $\theta$ of the slider 1 due to the acceleration $\alpha$ during access is determined by the following equation:

$$\theta = i_x + \theta_l + \theta_\Delta + \theta_b \tag{12}$$

where:

$\theta_r$=the twist due to the moment of the left flexible finger member 52 during the access operation;

$\Delta_r$=the descending amount of the end thereof in response to $\theta_r$;

$\theta_\Delta$=the twist of the slider 1 by $\Delta_l$ and $\Delta_r$; and $\theta_b$=the tilt of the slider 1 due to the bending shift of the right and left flexible finger members 52.

On the basis of material strength considerations, the following relationships are determined:

$$i_s = \frac{m\alpha}{E} \cdot \frac{3l_2{}^2}{l_{st}{}^3} \tag{13}$$

$$\theta_l = 7.5 \cdot \frac{ML_f}{El_f{}^3}\left(1 + 0.63\frac{t}{l_f}\right) \tag{14}$$

$$\theta_\Delta = 7.5 \cdot \frac{ML_f}{E \cdot l_f{}^3}\left(1 + 0.63\frac{t}{l_f}\right) \cdot \frac{l_t}{l_b} \tag{15}$$

$$\theta_b = \frac{8L_f{}^3}{E \cdot l_f \cdot t^3} \cdot \frac{1}{l_b{}^2}\left(m\alpha l - k\theta - 2\delta\frac{EI_2}{l_2}\theta\right) \tag{16}$$

$$M = \frac{m\alpha l_2}{2} - \frac{l_f}{2l_b}\left(m\alpha l - k\theta - 2\delta\frac{EI_2}{l_2}\theta\right) + \delta\frac{EI_2}{l_2}\theta \tag{17}$$

where $\delta$ is the parameter representative of the coupling condition between the coupling member 56 and the slider 1. When $\delta=0$, the coupling mode may be regarded as a pin support, and the slider movement is not restricted by the coupling member.

On the other hand, E is Young's modulus, k is a constant showing a rigidity of the air film spring during the rolling action of the slider, and $I_2$ is a sectional secondary moment, with $C=l=l_2$.

Comparing the magnitudes of the respective term with each other, $\theta$ is determined by the following equation:

$$\theta = \frac{m\alpha l}{k + 2\delta\frac{EI_2}{l_2}} + \frac{m\alpha l_2}{k + 2\delta\frac{EI_2}{l_2}} \cdot \frac{l_{b2}}{8L_f{}^2}\left(1 + \frac{l_f}{l_b}\right)\left(1 + 0.63\frac{t}{l_f}\right) \cdot \frac{7.5}{2} \tag{18}$$

If $\theta = 0$, the equation is rectified with respect to l:

$$l = \frac{-\dfrac{l_b{}^2}{8L_f{}^2}\left(1 + \dfrac{l_f}{l_b}\right)\left(1 + 0.63\dfrac{t}{l_f}\right)\dfrac{7.5}{2}}{1 - \dfrac{l_b{}^2}{8L_f{}^2}\left(1 + \dfrac{l_f}{l_b}\right)\left(1 + 0.63\dfrac{t}{l_f}\right)\dfrac{7.5}{2}} c \tag{19}$$

Furthermore, if the comparison of the respective terms in magnitude is effected, the following approximation is determined:

$$l \approx \frac{l_b{}^2}{8L_f{}^2} \cdot C \tag{20}$$

Now, because $C>0$, l is negative, since l is positive when it represents the upward direction from the center of gravity G of the slider 1 as shown in FIG. 12, the physical meaning of the formula is that it is possible to make $\theta$ substantially completely zero, i.e., the slant angle due to the deformation of the gimbal generated by the access acceleration of the slider 1 if the slider support point is located below the center of gravity G of the slider 1. For this reason, in the embodiment shown in FIGS. 8 and 9, the end of each stepped member connected to the coupling member is located by a distance l toward the floating surface 10 from the center of gravity G of the slider 1.

Figure 14:
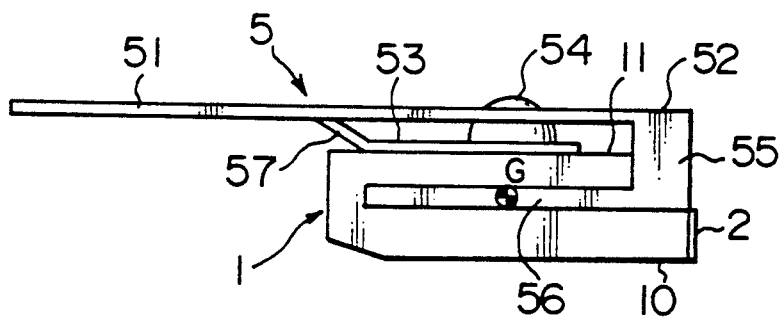
FIG. 14 is a side view of the portion of a third embodiment of the invention.
Figure 15:
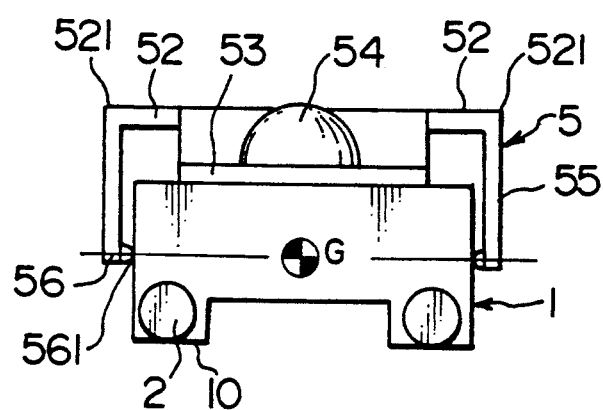
FIG. 15 is a front view of the portion of FIG. 14.

The difference between the first embodiment and the embodiment of FIGS. 14 and 15 is that the stepped members 55 are formed integral with the outer edge portions 521 extending from the flexible finger members 52. With such an arrangement, it is possible to advantageously make the gimbal small in size and to make the support system as a whole small in size. Furthermore, since it is possible to reduce the weight of the mass of the support system as a whole in accordance with the compactness of the gimbal 5, it is possible to reduce the size of the access mechanism from moving the magnetic head 2 in the radial direction.

According to this embodiment, a semispherical projection 561 is provided at each coupling member 56 provided in the plane including the center of gravity G of the slider 1 in parallel with the floating surface 10 of the slider 1. The projection may be triangular in cross section. By the spherical projection, the contact point between the coupling members 56 and the slider are exactly controlled to thereby make it possible to couple both components at a predetermined position. According to this embodiment, the predetermined position is identical with the level of the center of gravity G of the slider 1. According to this embodiment, it is therefore possible to expect the same advantages as described above in connection with the first embodiment.

Figure 16:
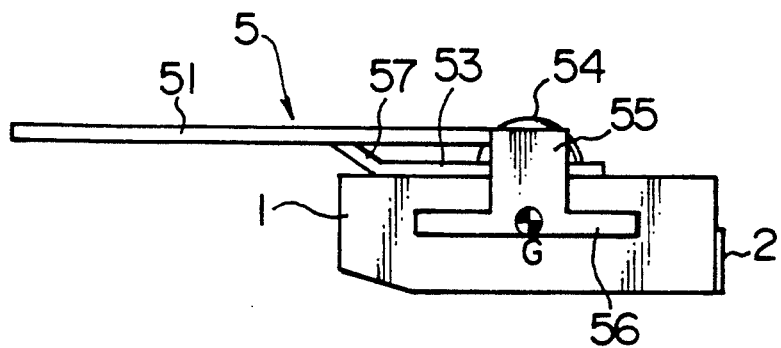
FIG. 16 is a side view of a portion of a fourth embodiment of the invention.
Figure 17:
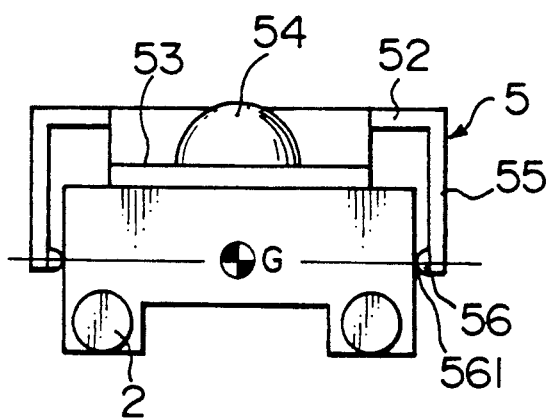
FIG. 17 is a front view of the portion of FIG. 16.

The difference between the embodiment of FIGS. 16 and 17 and the embodiment of FIGS. 14 and 15 resides in the fact that the flexible finger portions 52 extend in the longitudinal direction of the slider 1 and terminate in a vicinity of the center of gravity G of the slider 1, with the stepped members 55 being connected to the terminal ends of the flexible finger portions 52, and with the coupling members 56, which extend in the longitudinal direction 1, including the center of gravity G of the slider 1 parallel to the floating surface 10 of the slider 1, being formed integral with the other ends of the stepped member 55. Each coupling member 56 has a projection 561 in the same manner as in the embodiment of FIGS. 14 and 15. This arrangement is provided for exact positioning of the coupling points between the slider 1 and the coupling members 56 in the plane including the center of gravity G of the slider 1 in parallel with the floating surface 10 of the slider 1 in the same manner as in the embodiment of FIGS. 14 and 15. According to embodiment of FIGS. 16 and 17, since the stepped members 55 are located substantially at the position of the center of gravity G in the longitudinal direction of the slider 1, it is possible to prevent the slider 1 from rotating about the axis perpendicular to the plane in the floating surface 10 of the slider due to the access acceleration during this access operation. Thus, it is possible to reduce vibrations of the slider 1 during the access operation, and to perform the access operation for the aimed data in a short period of time. Also in the embodiment of FIGS. 16 and 17, it is possible to expect advantages as attained with the first embodiment.

Figure 18:
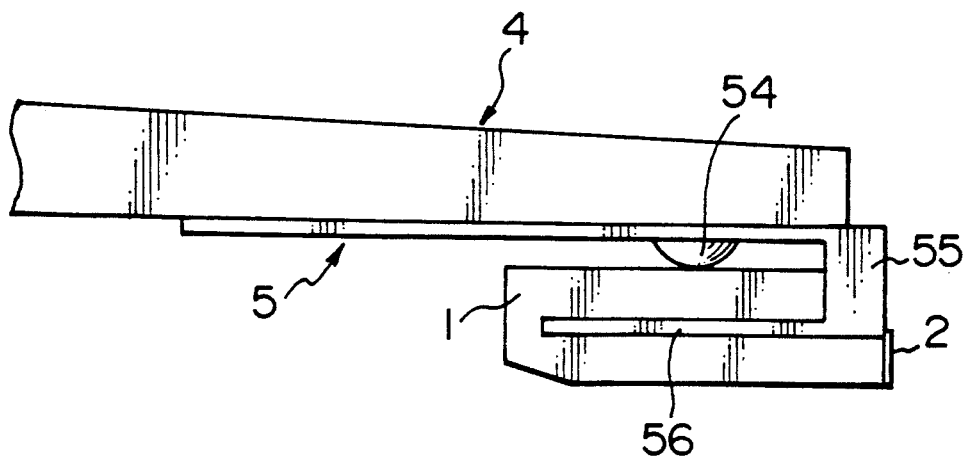
FIG. 18 is a side view of a portion of a fifth embodiment of the invention.
Figure 19:
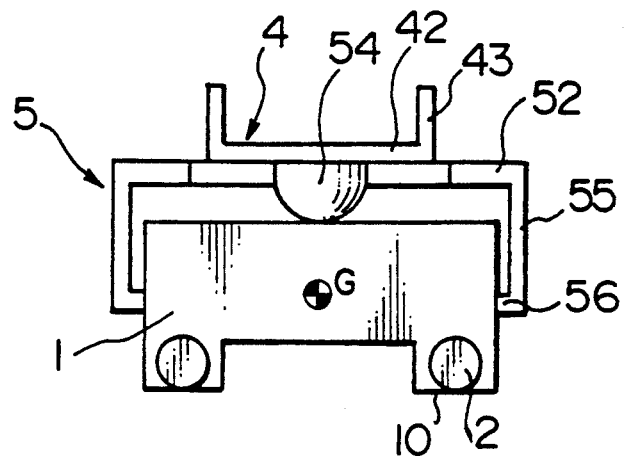
FIG. 19 is a front view of the portion of FIG. 18.

The difference between the embodiment of FIGS. 18 and 19 in the embodiment of FIGS. 14 and 15 is that a loading projection 54 is provided on a loading beam portion 42 of a loading arm 4 to thereby dispense with the central tongue portion 53 in the gimbal 5. With the provision of the loading projection port 54 in the loading beam portion 42, it is possible to facilitate the manufacture of the gimbal 5 to enhance the manufacturing efficiency. Namely, although it is difficult in a manufacturing aspect to form the loading projection 54 on a thin plate such as the gimbal 5, it is relatively easy to provide the loading projection 54 on the loading beam portion 42 as in the embodiment of FIGS. 18 and 19. Accordingly, it is possible to enhance the manufacturing efficiency and ensure substantially the same effects and advantages as obtained with the first embodiment.

The configuration and the coupling condition of the coupling members 56 are the same as those in the first embodiment. In other words, the end of each coupling member 56, which is a coupling portion with the stepped member 55, is located in the same plane as the plane including the center of gravity G in parallel to the floating surface of the slider 1.

Figure 20:
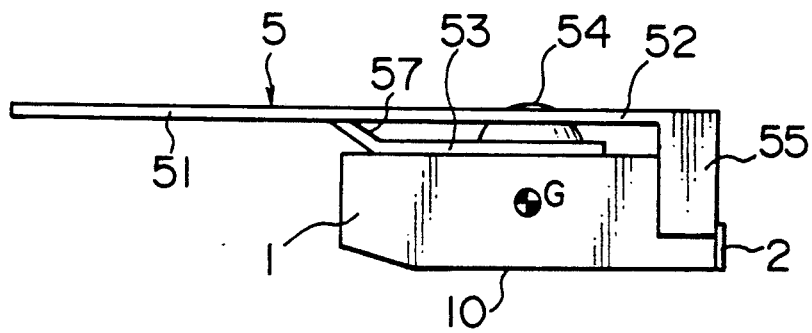
FIG. 20 is a side view of a portion of sixth embodiment of the invention.
Figure 21:
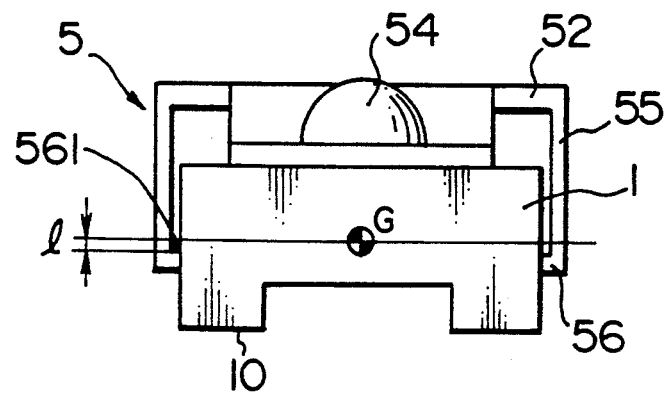
FIG. 21 is a front view of the portion of FIG. 20.

The difference between the embodiment of FIGS. 20 and 21 and the embodiment of FIGS. 14 and 15 resides in the fact that The difference between the embodiment of FIGS. 20 and 21 and the embodiment of FIGS. 14 and 15 resides in the fact that in the embodiment of FIGS. 20 and 21, the coupling members 56 do not extend in the extension direction of the flexible finger portions 52 but extend substantially perpendicular to the floating surface 10 of the slider with the same width as that of the stepped members 55. In addition, an edge 561 on the upper side of each coupling member 56, which edge is an end of the associated member 56 (i.e., the remote side edge of the coupling member 56 from the slider floating surface 10), is displaced by a distance l from the center of gravity G of the slider 1 in the same manner as in the embodiment of FIGS. 8–13. For this reason, with a simple gimbal structure, it is possible to make substantially completely zero the sinking or descending amount Δh of the slider 1 due to the access acceleration. It is further possible to enhance the productivity of the magnetic head support mechanism and the reliability of the magnetic disk apparatus.

Figure 22:
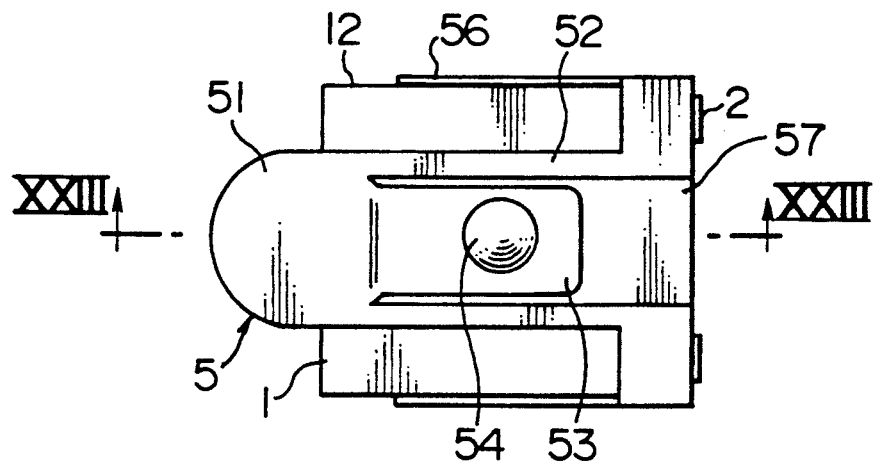
FIG. 22 is plant view of a portion of a seventh embodiment of the invention, as viewed from the load arm side.
Figure 23:
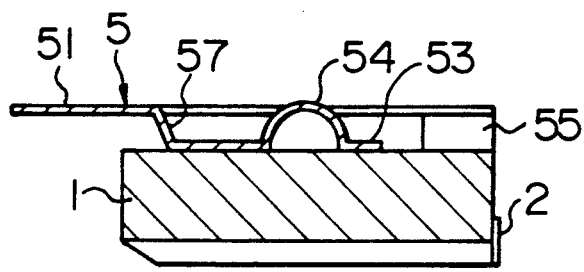
FIG. 23 is a cross-sectional view taken along the line XXIII—XXIII of FIG. 22.
Figure 24:
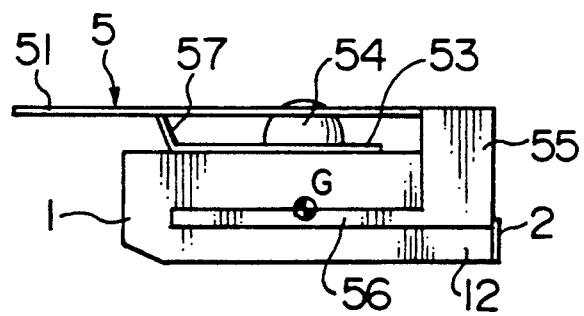
FIG. 24, is a side view of the portion of FIG. 22.
Figure 25:
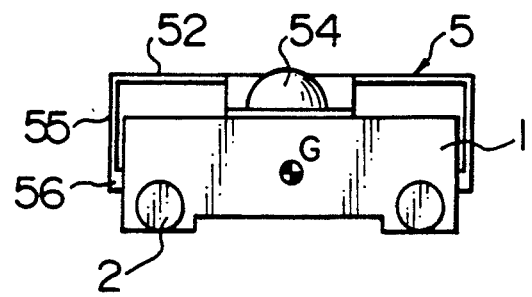
FIG. 25 is a front view of the portion of FIG. 22, as viewed from a magnetic head mounting side.

The difference between the embodiment of FIGS. 22-25 and the first embodiment is that, as shown in FIG. 22, the end portion, opposite to the coupling portion 51, of the flexible finger portions 52 extends widthwise of the slider 1 but terminates at each side face 12 of the slider 1 and is contiguous with the stepped member 55 (FIG. 23).

According to the embodiment of FIGS. 22-25, the end of each flexible finger portion 52 extends to have a shape shown in FIG. 22, thereby making it possible to reduce the size of the gimbal 5. The end of the stepped member 55, which end is a coupling portion between the stepped member 55 and the coupling member 56, is located within the same plane as the surface including the center of gravity G and parallel with the floating surface 10 of the slider 1 in the same manner as in the first embodiment to thereby ensure the like effect of the first embodiment.

Figure 26:
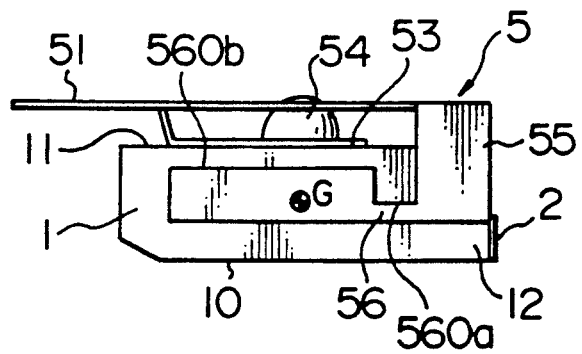
FIG. 26 is a side view of a portion of an eighth embodiment of the invention.

The difference between the embodiment of FIG. 26 and the embodiment of FIGS. 14 and 15 is that the width W of the coupling member 56 (i.e., the length in the perpendicular direction to the floating surface 10) is different in the longitudinal direction of the slider 1. Namely, an edge 560a, close to the stepped member 55, of the edge 560 of the coupling member 56 remote from the floating surface 10 is coplanar with the end of the stepped member 55 on the side of the coupling member 55 and is located in the same plane as the surface including the center of gravity G and parallel with the floating surface 10 of the slider 1, whereas, the edge 560b, remote from the stepped member 55, expands close to the rear surface of the slider 1 and extends in the longitudinal direction of the slider 1. With such an arrangement, it is possible to increase an area of the coupling member 56 and to enhance and ensure the coupling force between the slider 1 and the coupling member 56. Furthermore, the identification of the edge 560a of the coupling member 56 with the plane including the center of gravity G in parallel to the floating surface 10 of the slider 1 causes the end portion of the stepped member 55 on the side of the coupling member 56 to be coplanar with the plane including the center of center of gravity G in parallel to the floating surface of the slider 1 to thereby ensure like effects of the embodiment of FIGS. 14 and 15.

Figure 27:
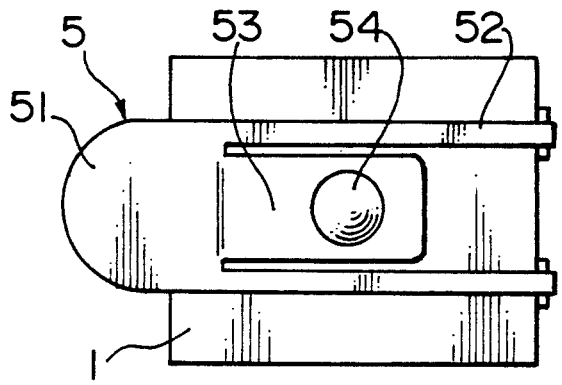
FIG. 27 is a plan view of a portion of a ninth embodiment of the invention, as viewed from a load arm side.
Figure 28:
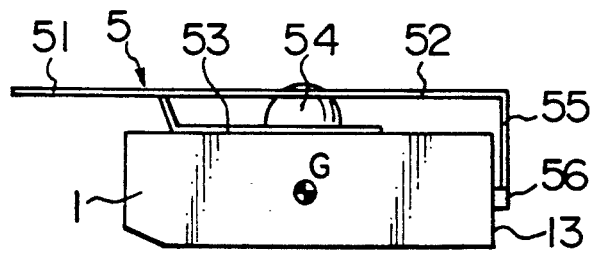
FIG. 28 is a side view of the portion shown in FIG. 27.
Figure 29:
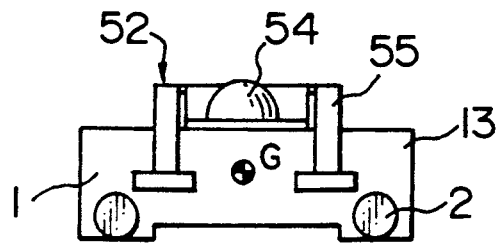
FIG. 29 is a front view of a portion shown in FIG. 27, as viewed from a magnetic head mounting side of the slider.

The difference between the embodiment of FIGS. 27-29 and the first embodiment is that a stepped member 55 is provided at an end of each flexible finger portion 52 in the longitudinal direction, and a coupling member, contiguous with the stepped member 55, is provided at an exit end surface 13 of the slider 1 where the magnetic head 2 is disposed. According to the embodiment of FIGS. 27-29, the stepped member 2 is provided at the end portion, in the longitudinal direction, of the flexible finger portion 52 whereby it is possible to make the gimbal small in size and to enhance the productivity. In addition, since the end of the stepped member 55, which end is a coupling portion between the stepped member 55 and the coupling member 56, is located within the same plane as the plane including the center of gravity G of the slider 1 in parallel to the floating surface 10 of the slider in the same manner as in the first embodiment, it is possible to ensure the same effect as that of the first embodiment.

Figure 30:
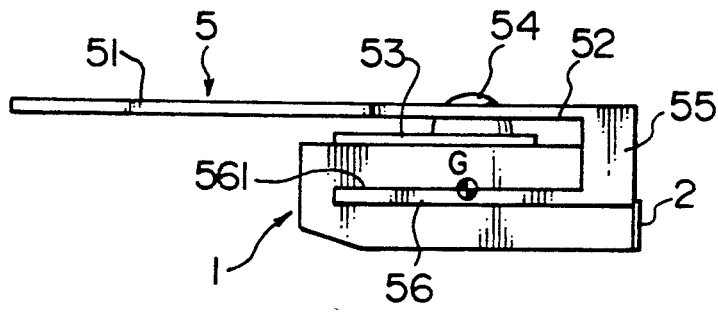
FIG. 30 is a view of a portion of a tenth embodiment of the invention.
Figure 31:
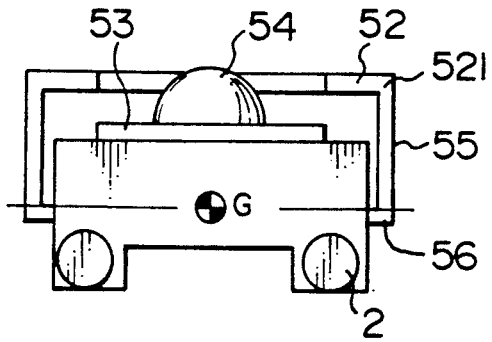
FIG. 31 is a front view of a portion of FIG. 30.
Figure 32:
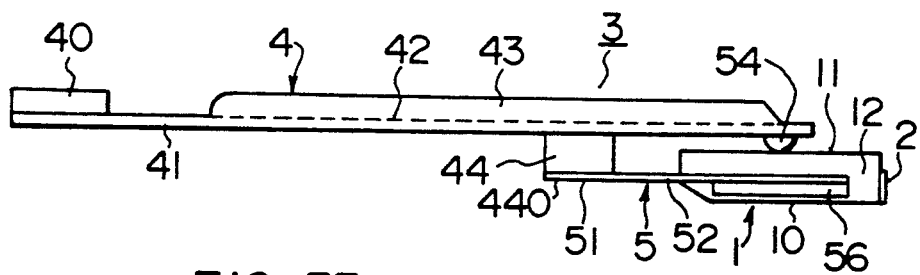
FIG. 32 is a front view of an eleventh embodiment of the invention.
Figure 33:
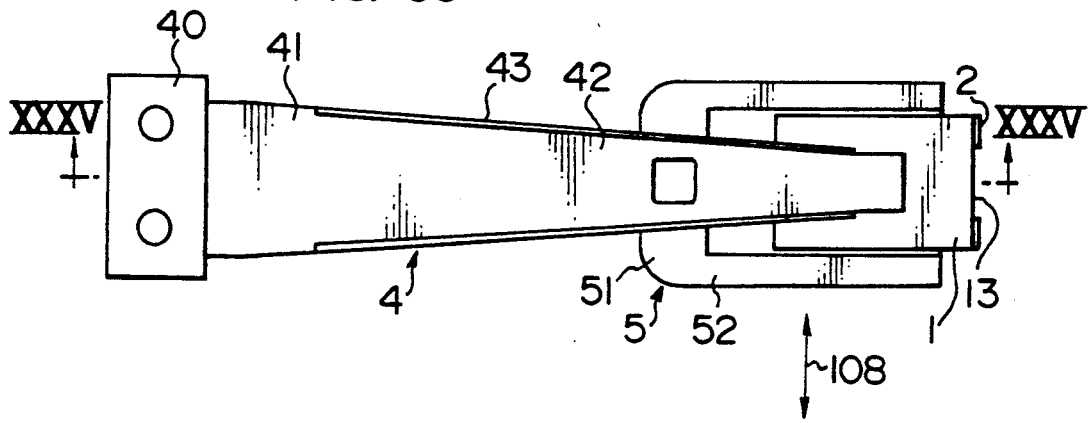
FIG. 33 is a top plan view of the embodiment of FIG. 32.
Figure 34:
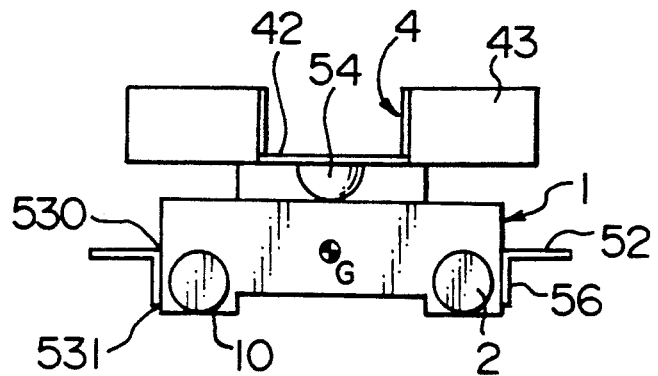
FIG. 34 is a side view of the embodiment of FIG. 32.
Figure 35:
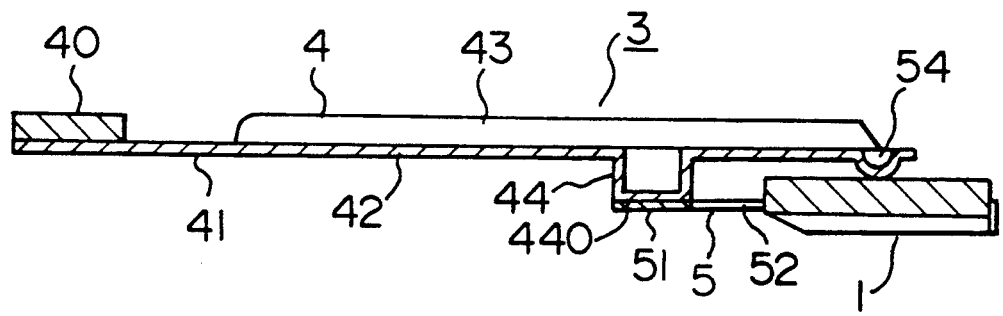
FIG. 35 is a cross-sectional view taken along the line XXXV—XXXV of FIG. 33.
Figure 36:
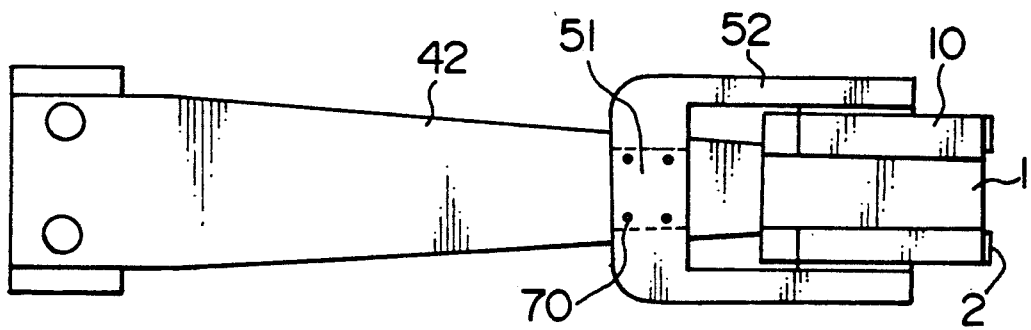
FIG. 36 is a bottom view of the embodiment of FIG. 32.
Figure 37:
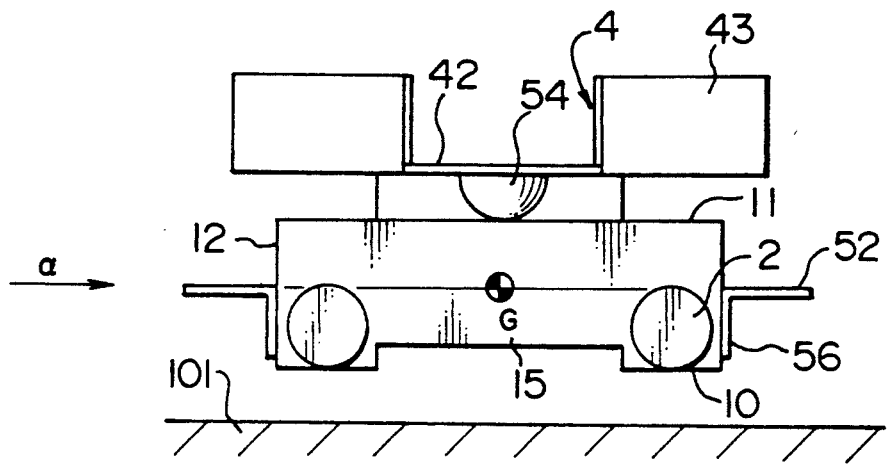
FIG. 37 is a view illustrating a function of the embodiment of FIG. 32.
Figure 38:
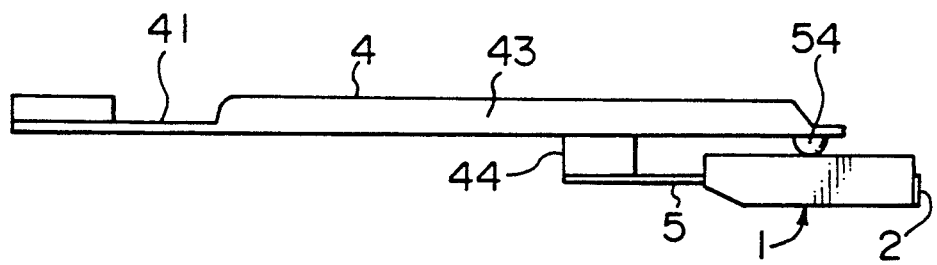
FIG. 38 is a front view of a twelfth embodiment of the invention.
Figure 39:
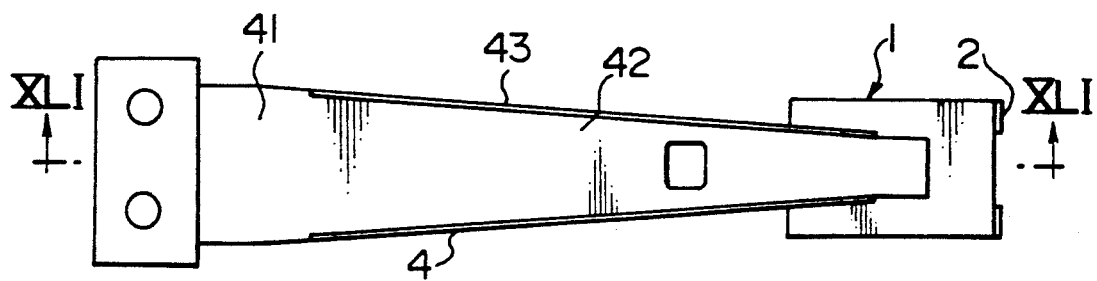
FIG. 39 is a top plan view of the embodiment of FIG. 38.

The difference between the embodiment of FIGS. 30 and 31 and the embodiment of FIGS. 14 and 15 is that the central tongue portion 53, which is provided through the stepped portion 57 from the coupling member 51 in the third embodiment, is independently provided by cutting the stepped portion 57. With such an arrangement, there is no restrictive force against the slider motion to due to a return force generated in the stepped portion 57. It is thus possible to support the slider 1 only by the flexible finger portions 52. For this reason, the edge of the stepped member 55, which edge is a coupling portion between the stepped member 55 and coupling member 56, is located within the same plane as the plane passing the center of gravity G substantially in parallel with the slider floating surface 10, so that the points to which the acceleration is applied during the access operation may be substantially completely identical with the center of gravity G. As a result, it is possible to suppress the sinking amount even more during access than in the embodiment of FIGS. 14 and 15.

In the embodiment of FIGS. 32-37, a magnetic support mechanism 3 is composed of a load arm 4 having a substantially trapezoidal shape having a width smaller toward the longitudinal distal end, and a plate-like gimbal 5 mounted on a coupling base 44 provided on a front rear surface of the load arm 4 and extending in the longitudinal direction. A slider 8 is mounted at the distal end portion of the gimbal 5. The proximal end of the load arm 4 is coupled to a guide arm 102 (FIG. 1) through a spacer 40 by, for example, screws.

The load arm 4 is composed of a planar flexible portion 41 close to the guide arm 102 and a loading beam portion 42 reinforced by flanged portions 43 formed by bending both edges, in a widthwise direction, of the loading beam portion 42 and extending from the flexible portion 42. The coupling base 44 projecting from the rear surface of the loading beam portion 42 is provided at a front portion of the loading beam portion 42. Such a coupling base 44 may be molded by pressing. The gimbal 5, made of a flexible plate, includes a large width coupling portion 51 coupled to the lower surface of the coupling base 44, two flexible finger portions 52 extending forwardly in parallel to each other from coupling portion 51, and coupling members 56 inwardly bent at a right angle and associated to the coupling members 56. The coupling members 56 are coupled to the side surface of the slider 1 to thereby support the slider 1 carrying the magnetic heads as a gimbal 5. The flexible portion 41 of the loading arm portion 42 generates a depression load to the slider 1 and the loading beam portion 42 serves to transmit the load to the slider 1. The coupling base 44 projecting from the rear surface of the loading beam portion 42 has a coupling surface 440 located in the same plane as the plane including the center of gravity G of the slider 1 in parallel to the floating surface of the slider 1 (which surface will hereinafter be referred to as a slider central surface). The large width coupling portion 51 of the gimbal 5 is mounted by, for example, spot welding 70 to the coupling surface 440. The flexible finger portions of the gimbal 5 have a parallel surface located in the same plane as the central surface of the slider 1 and in parallel with the floating surface. The slider 1 is interposed between the coupling members 56 contiguous and bent at a right angle with the flexible finger portions 52. The coupling members 56 are bonded by an adhesive or the like to the slider 1 so that the slider central surface is coplanar with the parallel plane of the gimbal 5. In this embodiment the edge, remote from the floating surface, of the coupling member 56 is coplanar with the flexible finger portions 52. If the coupling members 56 are located above the flexible finger portions 52, that is, the coupling members 56 are located on the remote side from a floating surface, the edge 53, close to the floating surface 10 of the coupling members 56 may be coplanar with the flexible finger portions 52.

Two magnetic heads are provided at an exit end surface 13, i.e., a distal end of the slider 1. A loading projection 54, formed on the flanged portion 42 of the load arm 4, is brought into contact with the rear surface 11 of the slider 1. The loading projection 54 serves to transmit the load generated in the flexible portion 42 of the load arm 4, to the slider 1 through the rear surface 11 of the slider 1.

A change in floating amount of the slider during the access operation in the magnetic head support mechanism according to the invention will be described.

As described above, the coupling member 56 perpendicular to the floating surface 10 of the slider, are bonded to the side surfaces 12 of the slider and extending in the longitudinal direction, are provided integrally with the flexible finger portions 52. The edge of each flexible finger portion 52, which edge is a coupling portion between the flexible finger portion 52 and the associated coupling member 56, is located in the same plane including the center of gravity G in parallel with the floating surface of the slider 1. For this reason, the acceleration α during the access operation is applied to the center of gravity G in parallel to the floating surface 10 through the outer flexible finger portions 52. As a result, it is possible to make zero the sinking amount Δh represented by the equation (9) and generated in the conventional magnetic head support mechanism. This is because the value $l_w$ (distance between the applied point of the acceleration α and the center of gravity G of the slider) of equation (9) may be made zero.

This makes it possible to avoid a fear that the slider 1 would be brought into contact with the disk due to the sinking amount Δh generated by the acceleration α during the access operation. It is of course possible to eliminate the fear that the data stored on the disk surface would be damaged. It is also possible to avoid a malfunction in a read/write operation of data.

Figure 40:
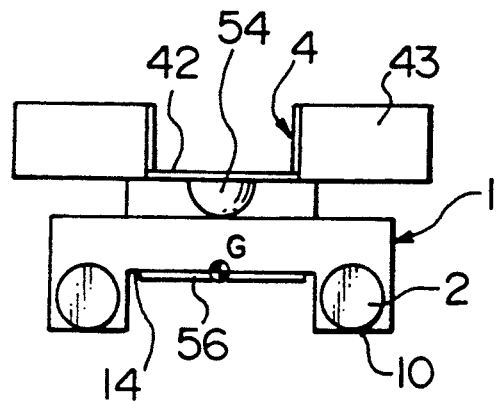
FIG. 40 is a side view of the embodiment of FIG. 38.
Figure 41:
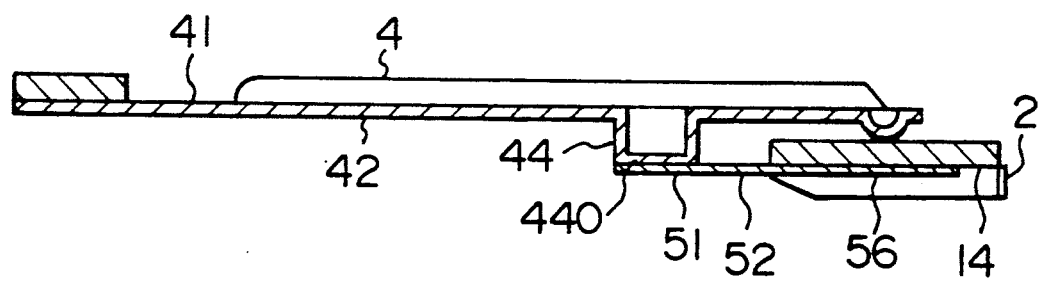
FIG. 41 is a cross-sectional view taken along the line XLI—XLI of FIG. 39.
Figure 42:
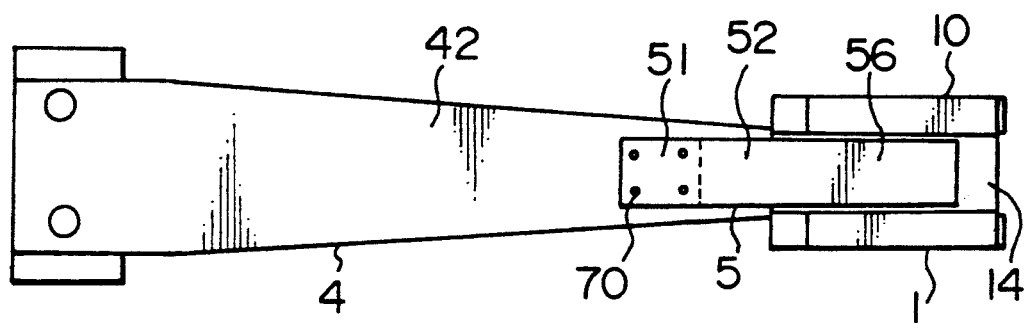
FIG. 42 is a bottom view of the embodiment of FIG. 38.
Figure 43:
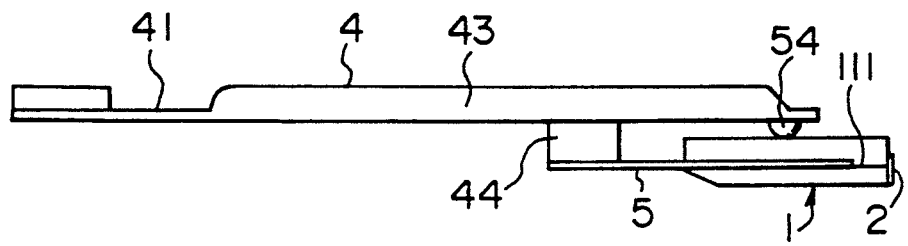
FIG. 43 is a front view of a thirteenth embodiment of the invention.
Figure 44:
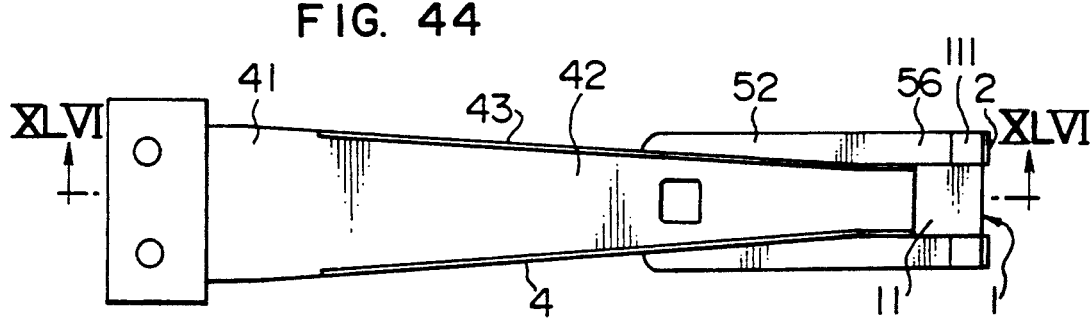
FIG. 44 is a top view of the embodiment of FIG. 43.

The difference between the embodiment of FIGS. 38-42 and the embodiment of FIGS. 32-37 is that, in the embodiment of FIGS. 32-37, the gimbal 5 is made of a single flexible planar plate with two flexible finger portions 52, whereas, in the embodiment of FIGS. 38-42, a single flexible finger portion 52 is formed, and a single coupling member 56, which is a coupling portion between the gimbal 5 and the slider 1 is provided on a bleed portion 14 between two rails for floating with the floating surfaces 10 of the slider 1 as shown in FIG. 40 to 42. For this reason, in the embodiment of FIGS. 30-42, the gimbal 5 may be a single rectangular, planar plate. It is unnecessary for the coupling members 56 for the slide 1 to be perpendicular to the flexible finger portions 52 as in the embodiment of FIGS. 32-37. In addition, since the coupling member 56 is provided on the bleed portion 14, it is possible to obtain a sufficient coupling area for the coupling between the components to positively support the slider 1. As a result, it is possible to considerably enhance the productivity of the gimbal 5 and to enhance the reliability of the magnetic head support mechanism. Furthermore, lower surface 440 of the coupling base 44 provided on the load arm 4 and the bleed portion 14 are formed in the plane including the center of gravity G in parallel to the slider floating surface 10, so that the applied point of acceleration generated during the access operation may be made identical with the center of gravity G of the slider 1. It is thus possible to expect the like effect of the embodiment of FIGS. 32-37 since there is no sinking of the slider 1. Namely, it is possible to prevent the slider 1 from coming into contact with disk. It is possible to avoid the damage of the disk stored on the magnetic disk surfaces and a malfunction in the data read/write operation.

Incidentally, it is possible to readily perform the coupling between the gimbal 5 and the bleed portion 14 of the slider 1 with an adhesive or the like.

Figure 45:
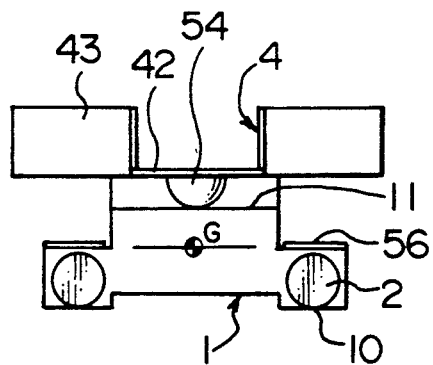
FIG. 45 is a side view of the embodiment of FIG. 43.
Figure 46:
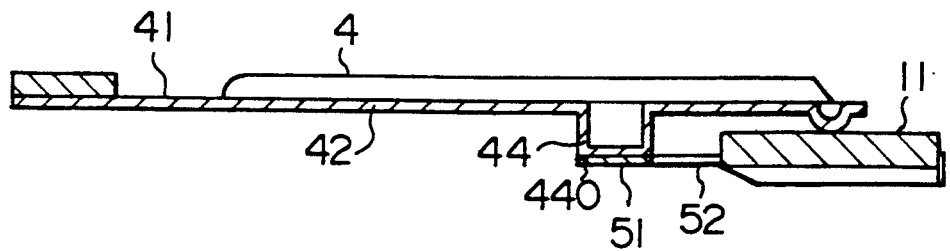
FIG. 46 is a cross-sectional view taken along the line XLVI—XLVI of FIG. 44.
Figure 47:
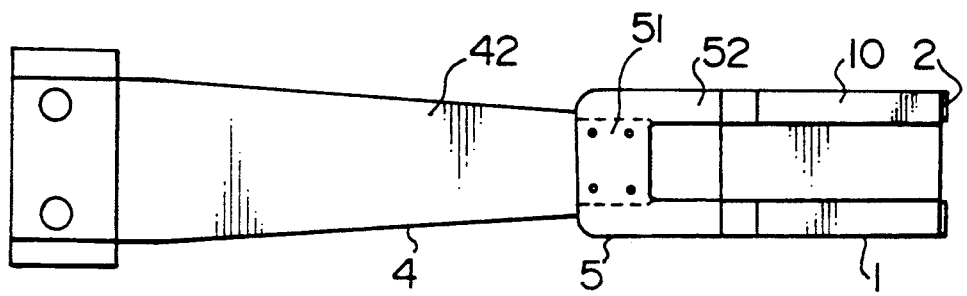
FIG. 47 is a bottom view of the embodiment of FIG. 43.

The difference between the embodiment of FIGS. 43-47 and the embodiment of FIGS. 32-37 is that, as shown in FIG. 45, the floating surface 10 of the slider 1 and the rear surface 11 of the slider 1 opposite to the floating surface 10 are cut out to be flush with the plane including the center of gravity G of the slider 1 in parallel with the floating surface 10 except for the surface with which the loading projection 54 is brought into contact, as shown in FIG. 45, and the coupling members 56 extending from the flexible finger portions 52 of the gimbal 5 are provided on the stepped rear surface 111, formed by cutting. For this reason, the gimbal 5 is made of a single planar plate. It is unnecessary to provide the coupling members 56 perpendicular to the flexible finger portions 52 in order to couple the coupling members 56 to the side surfaces of the slider 1. As a result, it is possible to facilitate the manufacture of the gimbal 5 and to enhance the productivity of the magnetic head support mechanism. Also, since the stepped rear surface formed in each coupling member 56 of the slider 1 is substantially formed on the same plane, it is possible to expect effects similar to that in the embodiment of FIGS. 32-37.

As described above, in any one of the embodiments shown in FIGS. 32-47, the loading projection 54 is provided integrally with the end portion of the load arm 4. However, it is also possible to provide the loading projection 54, that is provided to the load arm 4, to the rear surface 11 of the slider 1 in the reverse arrangement. In this manner, the loading projection 54 is provided independently of the load arm 4, thereby enhancing the productivity of the load arm 4.

In addition, in any of the embodiments shown in FIGS. 32 through 47, the coupling base 44 and the load arm 4 are integrally molded with each other. However, instead thereof, the coupling base 44, that is formed of a spacer (i.e., a planar plate) discrete from the load arm 4, may be coupled to the load arm 4 by spot-welding or adhesive. As a result, it is unnecessary to integrally form the coupling base with the load arm 4, to thereby enhance the productivity of the load arm 4.

In addition, although in any of the embodiments shown in FIGS. 32-47, wherein the loading projection 54 is provided, instead thereof, it is possible to dispense with the loading projection 54 from the load arm 4. This modification is available in supporting a slider, which generates a lower pressure (vacuum or negative pressure) than the atmospheric pressure between the floating surface 10 of the slider 1 and the surface of the magnetic disk. In this connection, it is unnecessary to provide the loading projection 54. In this case, since the loading projection 54 may be dispensed with, it is possible to enhance the productivity of the load arm 4. This type is suitable for a negative pressure type slider.

Figure 48:
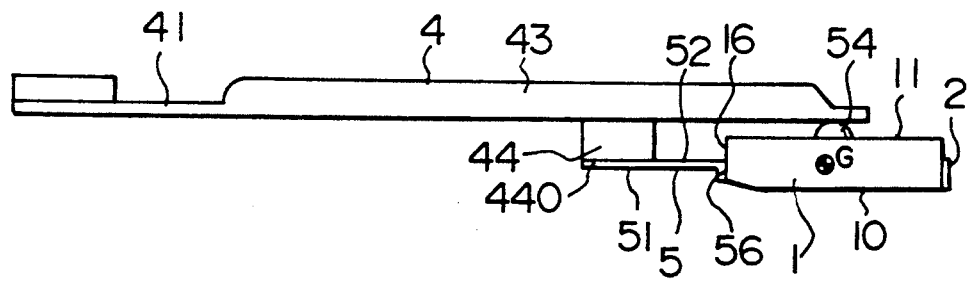
FIG. 48 is a front view of a fourteenth embodiment of the invention.
Figure 49:
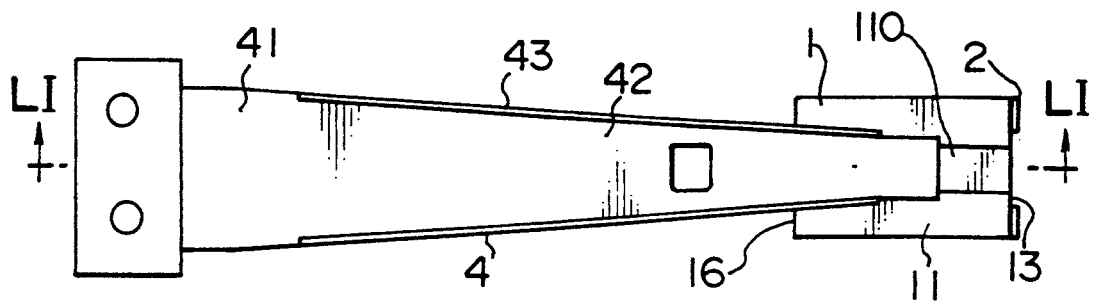
FIG. 49, is a top view of a fifteenth embodiment of the invention.
Figure 50:
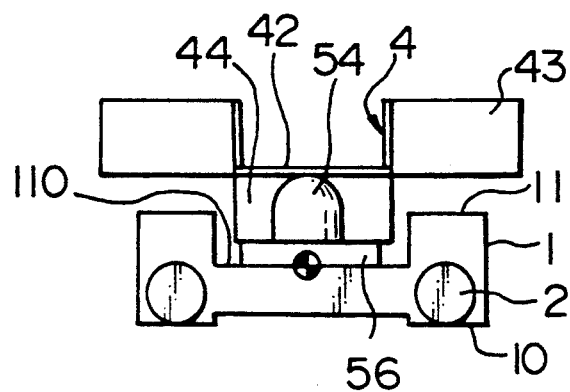
FIG. 50 is a side view of the embodiment of FIG. 49.
Figure 51:
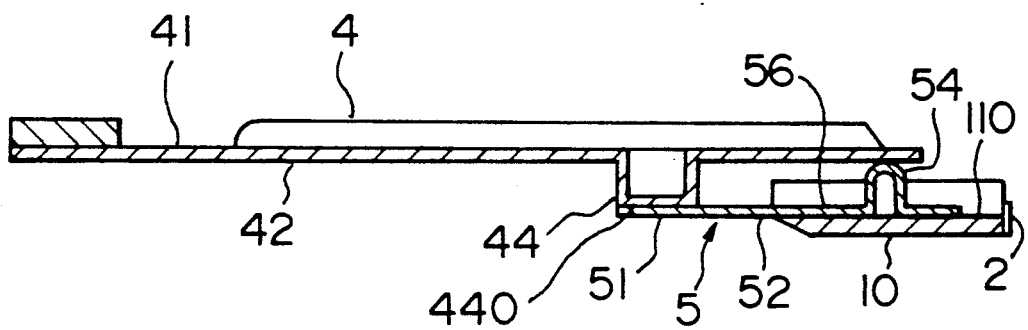
FIG. 51 is a cross-sectional view taken along the line LI—LI of FIG. 49.
Figure 52:
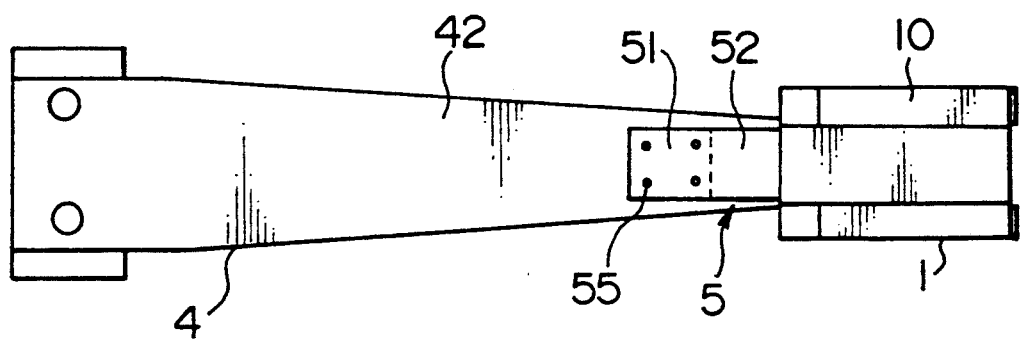
FIG. 52 is a bottom view of the embodiment of FIG. 49.

The difference between the embodiment of FIG. 48 and the embodiment of FIGS. 32-37 is that there is provided a coupling member 5 in a flow inlet end face 16 (into which the air between the magnetic disk and the slider enter) opposite to the magnetic head mount side of the slider 1. In the same manner as the embodiment of FIGS. 32-37, the flexible finger portion of the gimbal 5 is provided within the same plane including the center of gravity G of the slider 1 in parallel to the floating surface 10 of the slider. In accordance with the embodiment of FIG. 48, it is possible to make the gimbal 5 compact by using the coupling portion between the gimbal 5 and the slider 1 as the flow inlet end face 16 and to simplify the structure to thereby enhance the productivity. In addition, since the flexible finger portion 52 is provided within the plane including the center of gravity G in parallel with the floating surface 10 of the flexible finger portion 52, it is possible to ensure an effect similar to that of the embodiment of FIGS. 32-37. Although in the embodiment of FIG. 48, the coupling member is provided toward the floating surface 10 of the slider 1 from the flexible finger portion 52, it is possible to provide the flexible finger portion 52 toward the rear surface 11 of the slider 1 if the flexible finger portion 52 is provided within the plane including the center of gravity G in parallel to the floating surface 10.

The difference between the embodiment of FIGS. 49-52 and the embodiment of FIGS. 32-37 is that the coupling member 56 of the gimbal 5 is mounted in a groove 110 extending in a central longitudinal direction of the rear surface 11 of the slider 1. The groove 110 is formed in the longitudinal direction from the flow inlet end face 16 to the flow outlet end face 13 of the slider 1 in parallel to the floating surface 10 of the slider 1. The seat portion of the groove 110 is in parallel with the floating surface 10 and located within the same plane as that including the center of gravity G. In the embodiment of FIGS. 49-52, the loading projection 54 is formed in the coupling member 56 of the gimbal 5. Therefore, it is unnecessary to form the loading projection 54 on the load arm 4 to enhance the productivity of the load arm 4. Also, by providing the loading arm on the coupling member 56 of the gimbal 5, it is possible to enhance the positioning precision of the loading projection 54 and to control the acting point of the load, generated in the load arm 4, to the slider 1 with high accuracy, to thereby enhance the assembling precision of the magnetic support mechanism to stabilize the quality of the production. In addition, by providing the coupling member 56 of the gimbal 5 in the groove 110 formed in the rear surface of the slider 1 in the plane including the center of gravity G in parallel with the floating surface 10, it is possible to identify the acting point of acceleration during the access operation with the center of gravity G of the slider 1 to ensure an effect similar to that in the embodiment of FIGS. 32-37. In the embodiment of FIG. 49-52, it is possible to make the flexible finger portion 52 of a single flexible planar plate in the same manner as in the embodiment of FIGS. 38-42 and FIGS. 43-47, to enhance the productivity of the gimbal.

Figure 53:
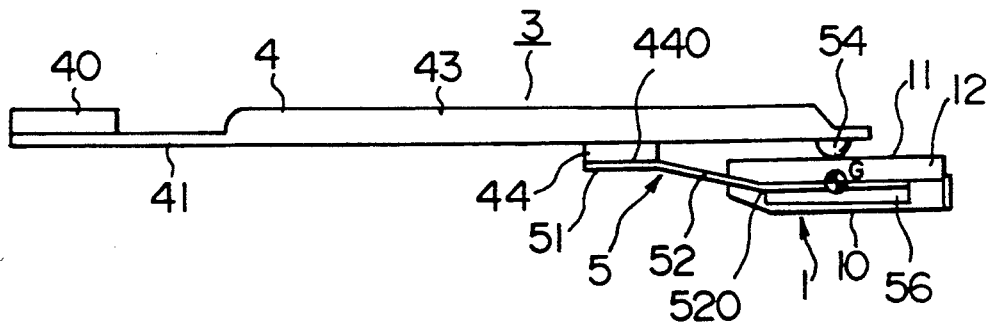
FIG. 53 is a front view of a sixteenth embodiment of the invention.
Figure 54:
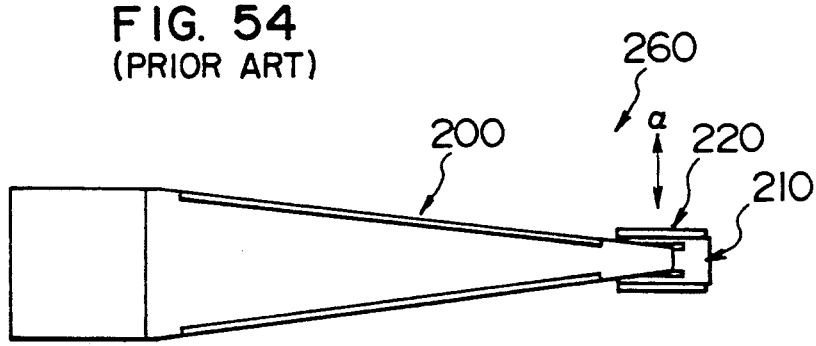
FIG. 54 is a plan view illustrating one example of a conventional in-line type magnetic head support mechanism.

The difference between the embodiment of FIG. 53 and the embodiment of FIGS. 32-37 is that the coupling surface 440 between the coupling base 44 formed on the load arm 4 and the gimbal 5 is not included in the common plane including the center of gravity G and parallel to the floating surface 10. However, in the embodiment of FIG. 53, the coupling portion 520 between the flexible finger portion 52 of the gimbal 5 and the coupling member 56 thereof is mounted on the common plane including the center of gravity G in parallel to the floating surface 10 of the slider 1. For this reason, the acting point of the acceleration during the access operation may be identified with the center of gravity G in the same manner as in the embodiment of FIGS. 32-37, thus ensuring an effect similar to that in the embodiment of FIGS. 32-37. Further, it is possible to suppress the sinking amount during the access operation for the foregoing reason also in the case where the coupling surface 440 of the coupling base 44 can not be formed in a common plane including the center of gravity G in parallel with the loading surface 10 as in the embodiment of FIGS. 32-37 from the restriction of the load arm. In the case where the coupling surface 440 could not be formed exactly in the same plane as the plane including the center of gravity G in parallel to the floating surface 10 of the slider 1, by providing the coupling point 520 between the flexible finger portion 52 and the coupling member 56 as in the present invention, it is possible to ensure an effect similar to that of the embodiment of FIGS. 32-37 to enhance the productivity of the magnetic head support mechanism.

In the embodiment of FIG. 53, the gimbal 5 is coupled to the load arm 4 through the coupling base 44. However, instead thereof, the coupling base may be dispensed with. In this case, the loading beam portion 42 of the load arm 4 serves also as the coupling base 44. In this modification, in the same manner as in the embodiment of FIG. 53, the coupling point 520 between the flexible finger portion 52 and the coupling member 56 is formed substantially in the same plane as the plane including the center of gravity G in parallel with the floating surface 10 of the slider 1. Thus, it is possible to identify the acting point of the acceleration during access operation with the gravitational center position of the slider to suppress the sinking or descending of the slider as in the embodiment of FIGS. 32-37.

According to the invention, it is possible to set the slider support point of the gimbal in the plane including the slider center of gravity in parallel to the floating surface of the slider, whereby it is possible to considerably suppress the reduction in floating amount of the slider (i.e., sinking amount) due to the access acceleration. Also, the slider support point is shifted toward the floating surface of the slider from the center of gravity of the slider to thereby suppress the reduction in floating amount of the slider due to the deformation of the gimbal during the access operation, so that it is possible to make substantially completely zero the reduction in floating amount of the slider during the access operation.

What is claimed is:

1. A magnetic head support mechanism comprising a slider carrying thereon magnetic head and having a floating surface facing a magnetic disk surface, and a gimbal for supporting said slider, wherein said gimbal includes a flexible member extending in a direction substantially perpendicular to an access direction of said slider, a connecting member for connecting one end of said flexible member to a member having a greater rigidity than that of said flexible member and adapted to be connected to an access mechanism, and a coupling member for coupling the other end of said flexible member to said slider, wherein a coupling between said coupling member of said gimbal and said slider occurs at a side surface of said slider perpendicular to the floating surface of said slider and a remote edge of the coupling member from the floating surface of said slider is disposed in a plane which contains a center of gravity of the slider and is parallel to the floating surface of the slider.

2. A magnetic head support mechanism comprising a slider carrying thereon a magnetic head and having a floating surface facing a magnetic disk surface, and a gimbal for supporting said slider, wherein said gimbal includes a flexible member extending in a direction substantially perpendicular to an access direction of said slider, a connecting member for connecting one end of said flexible member to a member having a greater rigidity than that of said flexible member and adapted to be connected to an access mechanism, and a coupling member for coupling the other end of said flexible member to said slider, wherein a coupling between said coupling member of said gimbal and said slider occurs at a surface other than a back surface of said floating surface of said slider and a remote edge of the coupling member form the floating surface of said slider is disposed in a first plane which contains a center of gravity of the slider and is parallel the floating surface of the slider or in a plane which is closer to said floating surface of said slider than said first plane.

3. The magnetic head support mechanism according to one of claims 1 or 2, wherein in the coupling between said coupling member of the gimbal and said flexible member, a distance between an end of said coupling member and said floating surface is not greater than a distance between a center of gravity of the slider and said floating surface.

4. A magnetic head support mechanism comprising a slider carrying thereon a magnetic head and having a floating surface facing a magnetic disk surface, and a gimbal for supporting said slider, wherein said gimbal includes a flexible member extending in a direction substantially perpendicular to an access direction of said slider, a connecting member for connecting one end of said flexible member to a member having a greater rigidity than that of said flexible member and adapted to be connected to an access mechanism, wherein the other end of si flexible member of said gimbal is connected to one end of a stepped member extending toward the floating surface, wherein the other end of stepped member is connected to a coupling member for coupling the other end of said flexible member to said slider by way of said stepped member, wherein a coupling between said coupling member of said gimbal and said slider occurs at a side surface of said slider perpendicular to the floating surface of said slider and a remote edge of the coupling member from the floating surface of said slider is disposed in a plane which is parallel to the floating surface of the slider and which plane is spaced form the floating surface of the slider a distance which is less than or equal to a distance of the center of gravity of the slider form the floating surface of the slider, and wherein said other end of said stepped member connected to said coupling member is maintained substantially in parallel to said floating surface, a distance between said other end of said stepped member connected to said coupling member and said floating surface being not grater than the distance between the center of gravity of said slider and said floating surface.

5. The magnetic head support mechanism according to one of claims 1 or 2, wherein the coupling between said coupling maimer and the slider has a semi-spherical shape or a triangular shape, a coupling between said coupling member and said slider is substantially in parallel to said floating surface of the slider, and wherein a distance between said coupling and said floating surface is not greater than a distance between a center of gravity of said slider and said floating surface.

6. A magnetic disk appartus comprising:
 a rotary shaft for mounting at least one magnetic disk;
  a slider carrying at least one magnetic head for recording/reproducing information stored in said disk; a magnetic head support mechanism for supporting said slider; and an access mechanism or shifting said magnetic head to a predetermined position on said magnet disk for recording/reproducing the information, wherein said magnetic head support mechanism for supporting said slider includes a gimbal for supporting said slider on said e surfaces of said slider which re perpendicular to a floating surface of said slider, a rigid structure support connected at a distal end portion to said gimbal and supported at a proximal end portion to a guide arm, and contact areas between the gimbal and said slider side surfaces, remote edges of said contact areas from the floating surface being located in a first plane which contains a center of gravity of said slider and is in parallel with said floating surface or in a parallel plane closer to said floating surface than said first plane.

7. A magnetic head support mechanism comprising a slider carrying at least one magnetic head and having a floating surface confront a magnetic disk to which read/write operations are effected by said magnetic head; a flexible gimbal extending in a direction substantially perpendicularly to an access direction of said slider for supporting said slider at a distal end portion; and a load arm composed of a rigid loading beam portion on which a rear end portion of said gimbal is mounted and a flexible potion, said magnetic head support mechanism being adapted to be driven in the access direction by an access mechanism coupled through an end portion of said flexible portion, wherein said gimbal has at a front end portion thereof a support potion having a planar surface located within the same plane as a slider central plane including a center of gravity of said slider and parallel to said floating surface, said slider being coupled to said support portion of said gimbal with said slider central plane and said planar surface being located in the same plane, and a coupling base extending toward said floating surface having a coupling surface substantially in the same plane as the slider central plane is provided on said loading beam portion, with the rear end portion of said gimbal being coupled to said occupying surface of said coupling base.

8. A magnetic head support mechanism comprising a slider carrying at least one magnetic head and having a floating surface confronting a magnetic disk to which read/write operations are effected by said magnetic head; a flexible gimbal extending in a direction substantially perpendicular to an access direction of said slider for supporting said slider at a distal, from end portion of said gimbal; and a load arm composed of a rigid loading beam portion on which a rear end portion of said gimbal is mounted and a flexible portion, said magnetic head support mechanism being adapted to be driven in the access direction by an access mechanism coupled through an end portion of said flexible portion, wherein said gimbal has at its front end portion a support portion having a planar surface located within the same plane as a slider central plane including a center of gravity of said slider and parallel to said floating surface, said slider being coupled to said support portion with said slider central plane and said planar surface being located in the same plane, and a coupling base having a stepped coupling surface in parallel to the slider central plane and extending toward said floating surface, said coupling base being provided on said loading beam portion, with the rear end portion of said gimbal being coupled to said coupling surface of said coupling base through a slanted portion from said planar surface.

9. The magnetic head support mechanism according to claim 7 or 8, wherein said coupling base is coupled integrally with said load arm.

10. The magnetic head support mechanism according to claim 7 or 8, wherein said coupling base is bonded to said load arm in unison.

11. A magnetic head support mechanism comprising a slider carrying at least one magnetic head and having a floating surface confronting a magnet disk tow which read/write operations are effected by said magnetic head; a flexible gimbal extending in a direction substantially perpendicular to an access direction of said slider for supporting said slider at a distal, front end portion of the gimbal; and a load arm including a rigid loading beam portion on which a rear end portion of said gimbal is mounted and a flexible portion, said magnetic head support mechanism being adapted to be driven in the access direction by an access mechanism coupled through an end portion of said flexible portion, wherein said gimbal has at its front end portion a support portion having a planar surface located within the same plane as a slider central plane including a center of gravity of said slider and parallel to said floating surface, said slider being coupled to said support portion with said slider central plane and said planar surface being located in the same plane, and a rear end portion of said slider is contiguous through a slanted portion extending from said planar surface and is connected to the floating surface side of said loading beam portion.

12. A magnetic head support mechanism according to one of claims 7, 8 or 11, wherein the support portion of said gimbal has a flanged portion bent from the planar surface.

13. The magnetic head support mechanism according to one of claims 7, 8 or 11, wherein said load arm having, at an end portion of said loading beam portion, a projection brought into contact with a rear surface of said slider opposite to the floating surface of said slider for transmitting a load generated in the flexible portion.

14. The magnetic head support mechanism according to one of claims 7, 8 and 11, wherein said slider having, at a rear surface opposite to the floating surface, a projection brought into contact with said loading beam portion for transmitting a load generated in said flexible portion.

* * * * *